United States Patent [19]

Appelt

[11] 4,224,676
[45] Sep. 23, 1980

[54] ARITHMETIC LOGIC UNIT BIT-SLICE WITH INTERNAL DISTRIBUTED ITERATIVE CONTROL

[75] Inventor: Daren R. Appelt, Austin, Tex.

[73] Assignee: Texas Instruments Incorporated, Dallas, Tex.

[21] Appl. No.: 920,754

[22] Filed: Jun. 30, 1978

[51] Int. Cl.³ ............................................. G06F 7/48
[52] U.S. Cl. .................................... 364/712; 364/900
[58] Field of Search ....................... 364/712, 200, 900

[56] References Cited

U.S. PATENT DOCUMENTS

| | | | |
|---|---|---|---|
| 3,757,308 | 9/1973 | Fosdick | 364/712 X |
| 3,798,606 | 3/1974 | Henle et al. | 364/200 |
| 3,984,670 | 10/1976 | Erickson et al. | 364/200 X |
| 4,037,089 | 7/1977 | Horninger | 364/716 |
| 4,087,854 | 5/1978 | Kinoshita et al. | 364/200 |
| 4,093,993 | 6/1978 | Sato | 364/712 |

*Primary Examiner*—David H. Malzahn
*Attorney, Agent, or Firm*—Thomas G. Devine; Leo N. Heiting; Melvin S. Sharp

[57] ABSTRACT

An arithmetic logic unit bit-slice implemented as an integrated circuit is able to perform iterative algorithms such as multiply and divide, using control logic which is also part of the integrated circuit to cause the selected algorithm to be performed. A plurality of the arithmetic logic unit bit-slices may be concatenated to provide the word size desired. The bit-slices are electrically identified as the most significant, least significant, and middle digits, such identification being provided to the control logic so that the control logic is identical on each bit-slice irresepective of its position within a word to enable the control logic to cause performance of the algorithms for any desired word length.

10 Claims, 26 Drawing Figures

ARITHMETIC LOGIC UNIT BIT-SLICE WITH INTERNAL DISTRIBUTED ITERATIVE CONTROL

BACKGROUND OF THE INVENTION

1. Field of the Invention

This invention relates to an integrated circuit arithmetic logic unit and more particularly to an arithmetic logic unit bit-slice implemented on a single semiconductor substrate having logic control also implemented on that substrate for causing the performance of algorithms such as multiply and divide designed so that a plurality of bit-slices may be concatenated to provide any desired word size with appropriate built-in control for causing the performance of the above mentioned algorithms for the entire word.

2. Description of the Prior Art

In the digital computer art, it was common practice to provide a computer having a fixed word length arithmetic logic unit. That is, the work length might be 32 bits or 64 bits with the computer having the control hardware to cause the arithmetic logic unit to operate. The operations typically included a simple add and subtract and also included iterative sequence algorithms such as multiply and divide. The adders of the arithmetic logic units were provided with circuitry for carry or borrow.

As integrated circuitry became commonplace, arithmetic logic units having short word lengths, such as four bits became available. These units are known as bit-slices. These bit slices contained borrow or carry logic and could be concatenated, but logic for algorithms such as multiply, divide and cyclic redundancy character generation had to be provided by outside control.

Using Large Scale Integration (LSI) techniques, the arithmetic logic unit bit-slice disclosed herein was implemented. It is of a short word length (four bits in the preferred embodiment) and provided with carry logic, but more importantly is provided with circuitry for identification of the arithmetic logic unit bit-slice within a larger word and with control logic, reactive to the bit-slice position, that enables the performance of algorithms such as multiply, divide, and cyclic redundancy character generation.

BRIEF SUMMARY OF THE INVENTION

An integrated circuit arithmetic logic unit bit-slice is provided with A and B operand inputs, carry-in and carry-out connections, command inputs and other external functions. An arithmetic unit is connected to receive the A and B inputs and to provide an output resulting from the selected arithmetic operation performed on the A and B inputs together with the carry-in input. The operation of the arithmetic unit is dictated by control logic and the output of a Programmable Logic Array (PLA) for decoding external function inputs including command inputs. Also provided with each bit-slice is a circuit indicating, by digital signals, where the particular bit-slice is located within a given word, such indicating signal being utilized by the control logic. This indicia circuit provides three possible digital outputs with a single input; a program counter and a memory counter, each electrically connected to the output of the arithmetic unit and each having a connection for a counter carry-in from another bit-slice and a counter carry-out for connection to a higher order bit-slice. Also provided are an accumulator register and a multiplier/quotient register, both used in conjunction with the arithmetic unit for various operations. Each bit-slice has control logic for controlling operations and a PLA for decoding operations. The control logic and the PLA, together with the circuitry for indicating the position of the bit-slice within a word, enable the inclusion in the integrated circuit of a means for performing iterative sequencing such as that required in multiply, divide and cyclic redundancy character generation algorithms.

The principal object of this invention is to provide an ALU bit-scale implemented on a single semiconductor chip, with control logic included on that chip to enable the bit-slice to perform algorithms including such as multiply and divide alone or when concatenated with a plurality of bit-slices to form a larger word.

This and other objects will become more evident in the detailed description that follows.

BRIEF DESCRIPTION OF THE DRAWINGS

FIG. 8 is a chart representing a part of the PLA of FIG. 1.

FIG. 9 is a chart representing another part of the PLA of FIG. 1.

FIG. 15 is a map of the multiply, divide, and CRC generation portion of the PLA of FIG. 1.

FIG. 16a–16b is a map of a general instruction portion of PLA of FIG. 1.

DETAILED DESCRIPTION OF THE INVENTION

Figure 1:
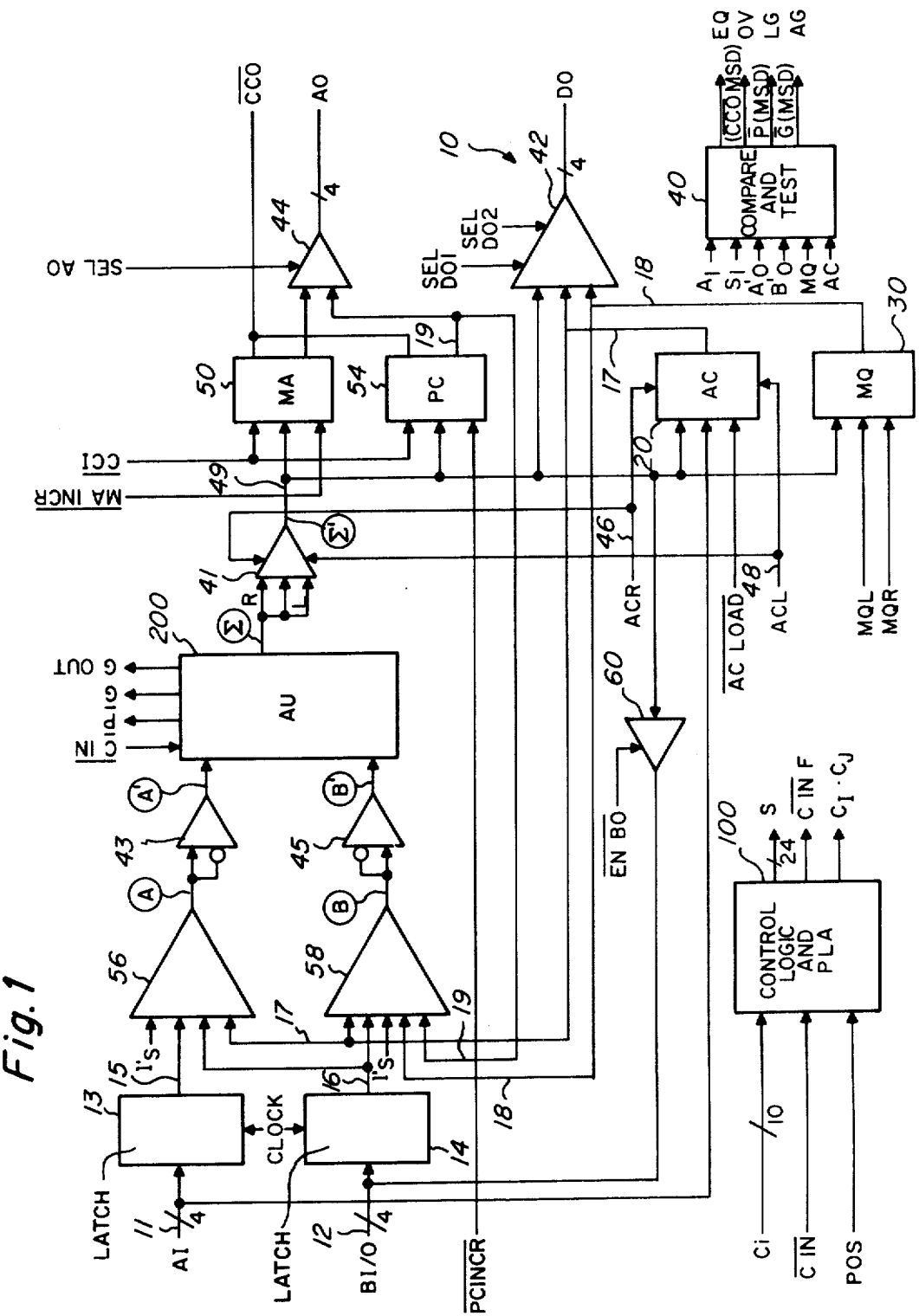
FIG. 1 is an illustration, in logic diagram, of an arithmetic logic unit bit-slice.

The arithmetic logic unit bit-slice 10 (known as Tl-74S481) of this invention is illustrated in FIG. 1. Inputs AI and BI are shown available at inputs 11 and 12 respectively. Latches 13 and 14 receive the AI and BI inputs respectively. These latches (flip-flops) are clocked by a clock that must be brought in from outside the bit-slice 10. An input terminal on bit-slice 10 (not shown) receives the clock signal (at the frequency selected by the user) and distributes that clock signal to selected components of bit-slice 10. Those components generally include flip-flops and registers.

Multiplexer 56 receives inputs from both of latches 13 and 14 and also has an input for forcing all 1's on the output of multiplexer 56. Multiplexer 58 receives inputs from both of latches 13 and 14 and also has an input for forcing all 1's on the output of multiplexer 58. Multiplexers 56 and 58, in this preferred embodiment, each provide a four bit digital word output and are both of conventional design which is not necessary to be described herein. The four bit signal A from multiplexer 56 and the four bit signal B from multiplexer 58 are sent directly or inverted by devices 43 and 45, respectively, and then sent, as A' and B' to the arithmetic unit 200. In addition to inputs A' and B', arithmetic unit 200 has an input $\overline{C\ IN}$. Therefore, a full addition of A'+B'+C IN will result in $\Sigma + \overline{C\ OUT}$, the latter term representing the carry out. The arithmetic unit 200 also provides signals P (propagate) and G (generate) which are useful in carry look-ahead, an optional operation. The output signal Σ from AU 200 is applied to sum bus 41 which provides on its output signal Σ' either directly or shifted one bit to the left or one bit to the right. The output signal Σ' is applied to the inputs of memory address counter register 50, program counter register 54, accumulator 20 and multiplexer/quotient register 30 via line 49. Σ' is also applied to the input of 3-state device 60 whose output is connected to terminal 12 to supply an output BO on that terminal. The 3-state device 60 is enabled an external function signal $\overline{EN\ BO}$ (enable B output). The 3-state device 60 is a well known circuit which, when not enabled, provides electrically an open circuit and when enabled applies either a binary "1" or a binary "0". In this preferred embodiment, Schottky TTL logic is employed where +5 volts and ground are the reference voltages. An arbitrary selection of any voltage over +2.0 volts (usually approximately +3.0 volts) is designated a binary "1". Any voltage under +0.8 volts (usually at approximately 0.2 volts) is designated a binary "0". The output Σ' of sum bus 41 is also applied to the input of the data out (DO) multiplexer 42 having external inputs "SEL D01" and "SEL D02" (Select DO1 and Select DO2) to provide one of four possible data out (DO) outputs. Address out port multiplexer 44 has inputs from the output of memory address counter 50 and from program counter 54 with an outside enable signal "SEL AO" (Select AO) to provide address out (AO). Outputs from counters 50 and 54 are connected together to provide $\overline{CCO}$ which is the negated counter carry out from either counter, selectively. External function input $\overline{MA\ INCR}$ (memory address counter increment) is applied as another input to counter 50 as is $\overline{CCI}$ (counter carry in) which serves as another input, selectively, to counter 54 as well. Counter 54 has an external function input $\overline{PC\ INCR}$ (program counter increment) and has an output connected as an input of multiplexer 58. Input ACR on line 46 is an input for sum bus 41 as is input ACL on line 48 because the respective registers are separately selected. Input ACR is connected to the least significant bit of the accumulator 20 and ACL is connected to the most significant bit of accumulator 20. Input ACL of the Most Significant Digit (MSD) bit-slice is connected to input ACR of the Least Significant Digit (LSD) bit-slice for the various shift modes available. Input MQR is connected to the least significant bit of the multiplier/quotient register 30 and MQL is connected to the most significant bit. Input MQL of the MSD but-slice is connected to input ACR of the LSD bit-slice. An output of accumulator 20 serves as an input to data out multiplexer 42 as does an output from the multiplier quotient register 30. The output from accumulator 20 and also the output from register 30 each serve as inputs to multiplexer 58. Compare and Test 40 is physically a part of the arithmetic unit 200 in the preferred embodiment. The inputs A, S, A'$_O$, B'$_O$, MQ and AC provide signal EQ (when all of the bits in sim 41 are "0" or when all are "1"); OV (overflow); LG (logically greater than); AG (arithmetically greater than). Signals OV, LG and AG are developed in the most significant digit (MSD) bit-slice. In the least significant digit (LSD) bit-slice and in the middle digit(s) (MID) bit slice(s) they are respectively $\overline{CCO}$ (counter carry out); $\overline{P}$ (propagate); $\overline{G}$ (generate).

Control logic and PLA 100 has 10 command inputs C$_I$, a position voltage input POS for developing a binary signal indicating the relative position in the word of the particular bit-slice and $\overline{C\ IN}$ which is a negated carry-in signal from a lower order stage. The output of logic 100 is $\overline{C\ IN\ F}$ (a forced negated carry-in signal); C$_I$, C$_J$ (alterable input command signals); S (24 control lines for controlling the operation of the arithmetic logic unit bit-slice 10).

Figure 2:
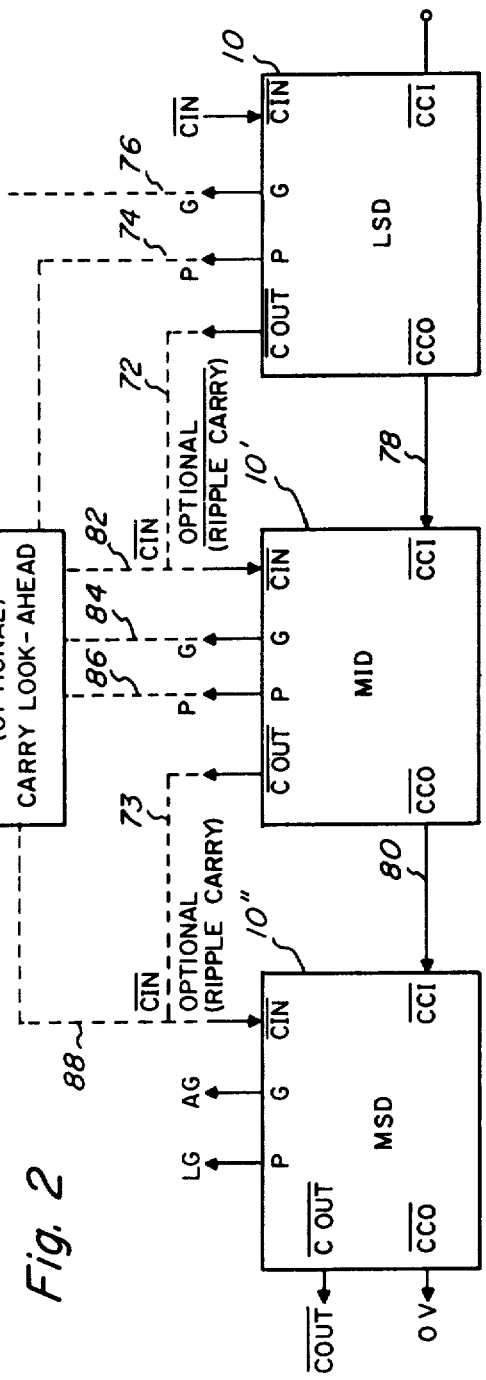
FIG. 2 is a block diagram illustrating three arithmetic logic unit bit-slices connected in series to form an arithmetic logic unit three times the size of the individual bit-slice.

FIG. 2 illustrates three arithmetic logic unit bit-slices concatenated to form a 12 bit word with bit-slice 10 representing the least significant digit, bit-slice 10' illustrating a middle digit and bit slice 10" illustrating the most significant digit. It should be pointed out that any number of middle digits could be added and illustrating three bit-slices is only for easy illustration. The negation of the counter carry out of bit-slice 10 is connected to the $\overline{CCI}$ of bit slice 10' by way of connection 78 and $\overline{CCO}$ of bit-slice 10' is connected to the $\overline{CCI}$ input of bit-slice 10'. $\overline{C\ OUT}$ of bit slice 10 is connected to the $\overline{C\ IN}$ of bit-slice 10' and $\overline{C\ OUT}$ of bit-slice 10' is connected to $\overline{C\ IN}$ of bit-slice 10". These last connections are optional and represent a ripple carry connection. If desired, the signals P and G from the least significant digit and the middle digit can be connected via lines 74, 76, 84 and 86 to carry-look-ahead unit 89 which may be a TI-74S128 unit.

Figure 3A:
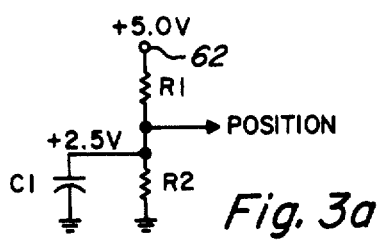
FIG. 3a schematically illustrates the source of three potentials for use with the circuit of 3b.

FIG. 3a shows resistors R1 and R2 of equal value, with one end of these connected together and the other end of resistor R1, terminal 62, being connected to +5.0 volts and the other end of resistor R2 being connected to ground, thereby developing a voltage of +2.5 volts at the POSITION terminal which is filtered by capacitor C1, connected to ground.

Figure 3B:
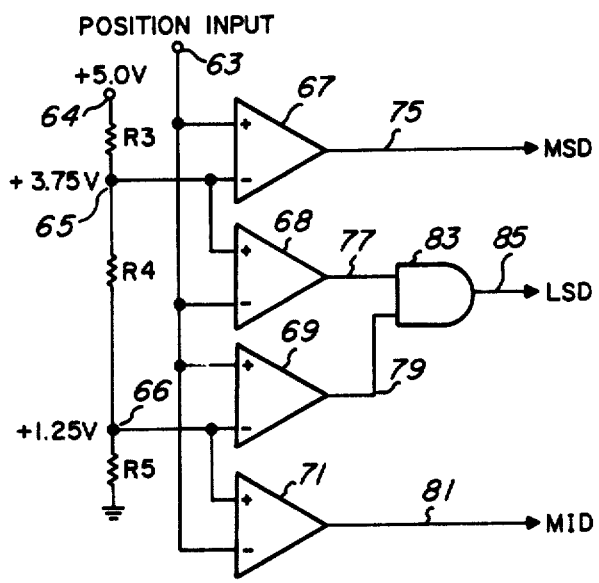
FIG. 3b schematically illustrates a conversion of a voltage level to a digital signal.

FIG. 3b illustrates a circuit for converting one of three possible voltage inputs (0 volts or ground +2.5 volts or +5.0 volts) applied to a single input 63 into a binary signal MSD (most significant digit), LSD (least significant digit) or MID (middle digit). Input terminal 63 is connected to the positive terminals of comparators 67 and 69 and to the negative terminals of comparators 68 and 71. A voltage divider is comprised of equal value resistors R3 and R5 and resistor R4 which is double the value of resistor R3 or R5. One end of resistor R3 is connected to +5.0 volts at terminal 64 and its other end is connected to one end of resistor R4 at terminal 65 at which +3.75 volts is developed and applied to the negative input of comparator 67 and to the positive input of comparator 68. One end of resistor R5 is connected to ground and the other end is connected to the other end of resistor R4 at terminal 66 at which +1.25 volts is developed and applied to the negative input of comparator 69 and to the positive input of comparator 71.

The output of comparator 67 on line 75 is signal MSD. The output of comparator 68 on line 77 serves as an input to AND circuit 83 whose other input on line 79 comes from comparator 69 and whose output on line 85 is signal LSD. Comparator 71 provides on line 81, output signal MID.

In operation, when a middle digit position is required, a ground potential is applied to POS in FIG. 1 which is shown as POSITION INPUT terminal 63 in FIG. 3b. This ground potential is applied to the positive input of comparator 67 whose negative input is connected to +3.75 volts, causing a "0" output on line 75. Ground is applied to the negative side of comparator 68 whose positive terminal is connected to +3.75 volts causing a "1" output on line 77, as one input of AND circuit 83. The ground potential is also applied to the positive terminal of comparator 69 whose negative terminal is connected to +1.25 volts causing a "0" output on line 79 which, when combined with the "1" input on line 77, the AND circuit 83 to provide an "0" output on line 85. This ground potential is also applied to the negative terminal of comparator 71 whose positive terminal is connected to 1.25 v thereby causing a "1" output on line 81, which is the MID signal, indicating that the bit-slice is a middle digit.

If the bit-slice is to be used as the most significant digit, +5 volts is applied to the POSITION INPUT terminal 63 which is applied to the positive terminal of comparator 67 whose negative terminal is connected to +3.75 volts, causing a "1" output on line 75 indicating an MSD position. The +5 volts is also applied to the negative input of comparator 68 whose positive input is connected to +3.75 volts, causing a "0" output on line 77. The +5 volts is also applied to the positive terminal of comparator 69 whose negative terminal is connected to +1.25 volts causing a "1" output on line 79. AND circuit 83, with a "0" input on line 77 and "1" input on line 79 provides a "0" output on line 85 indicating that it is not an LSD position. The +5.0 volts is also applied to the negative input of comparator 71 whose positive input is connected to 1.25 volts causing a "0" output on line 81 indicating that a MID position has not been selected.

Finally, when a least significant digit position is desired, a +2.5 volt potential is applied to POSITION INPUT terminal 63 of FIG. 3b, thereby applying that voltage to the positive terminal of comparator 67 whose negative terminal is connected to +3.75 volts thereby providing a "0" output on line 75 indicating that the bit-slice selected is not the most significant digit (MSD). The +2.5 volts is also applied to the negative terminal of comparator 68 whose positive terminal is connected to +3.75 causing a "1" output on line 77. The +2.5 volts is connected to the positive terminal of comparator 69 whose negative terminal is connected to +1.25 volts causing a "1" output on line 79. AND circuit 83 is thereby activated to provide a "1" output on line 85 indicating a least significant digit (LSD). The +2.5 volts is also applied to the negative input of comparator 71 whose positive input is connected to +1.25 volts, causing a "0" output on line 81 as the MID signal.

The above illustrates how a single voltage input applied to terminal 63 provides one of three possible digital outputs, namely, MSD, LSD or MID.

Figure 4:
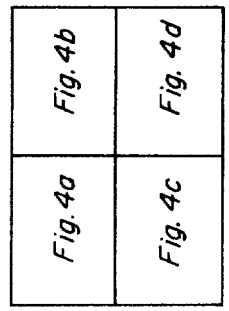
FIG. 4 shows the relative position of FIGS. 4a–4d which, compositely, schematically illustrate the arithmetic unit, the sum bus and the compare and test circuitry of FIG. 1.

FIGS. 4a–4d interconnected as shown in FIG. 4 form a logic representation of the arithmetic unit 200, the compare and test 40 and the sum bus multiplexer 41 of FIG. 1.

The arithmetic unit's operation is controlled by $S_8$, $S_9$, and $S_{10}$. The operations that are caused to be performed by these control signals and others are defined later. As an example, for an addition of A' plus B' plus C IN, $S_8=0$, $S_9=0$ and $S_{10}=0$. Signal $S_8$ is an input to NOR gate 203 for providing an output signal $P_0$ and also is an input to three identical NOR gates which provide signals $P_1$-$P_3$, respectively. Signal $S_9$ is inverted through inverter 201 whose output is an input to AND gate 202 whose output, in turn, is the other input to NOR gate 203.

The signal $S_9$ out of inverter 201 is an input to three other AND circuits identical to AND circuit 202 whose outputs are the other inputs to the NOR circuits providing signals $P_1$-$P_3$, respectively. Signal $A'_0$, the highest order bit of AI input as shown in FIG. 1, is applied to AND gate 202 and to NOR gate 204 whose other input is signal $B'_0$, the highest order bit of input signal BI as shown in FIG. 1. The output of NOR circuit 204 provides signal $G_0$. In identical fashion, signals $A'_1$-$A'_3$ and $B'_1$-$B'_3$ are applied to identical circuits which provide output signals $G_1$-$G_3$, respectively. Signals $P_0$ and $G_0$ are inputs to exclusive NOR circuit 206. In identical fashion, inputs P1, G1-P3, G3 are inputs to exclusive NOR circuits 207, 208 and 209, respectively.

Control signals $S_{10}$ is inverted through inverter 205 and is an input to NAND circuit 219. Signals $\overline{\text{C IN}}$ and $\overline{\text{C INF}}$ also are inputs to NAND circuit 219. Exclusive NOR circuit 209 has an output which is an input to exclusive NOR circuit 223 whose other input comes from NAND circuit 219. The output of exclusive NOR circuit 223 is signal $\Sigma_3$ which is the sum of the lowest order bits plus the carry-in. $\overline{\text{C INF}}$ is a signal developed internally and is a forced carry. For a normal addition, the carry-in signal $\overline{\text{C IN}}$ should be considered coming from a lower order digit. In such case, the signal from NOR circuit 223 is:

$$\Sigma_3 = \overline{\text{CIN}} \cdot \overline{G}_3 \cdot P_3 + \overline{\text{CIN}} \cdot G_3 \cdot \bar{P}_3 + \text{CIN}_3 \cdot \overline{G}_3 \cdot \bar{P}_3 + \text{CIN} \cdot G_3 \cdot P_3$$

In terms of the input signals this equation can be expressed as:

$$\Sigma_3 = \bar{A}_3 \cdot B_3 \cdot \overline{\text{CIN}} + A_3 \cdot \bar{B}_3 \cdot \overline{\text{CIN}} + A_3 \cdot B_3 \cdot \text{CIN} + \bar{A}_3 \cdot \bar{B}_3 \cdot \text{CIN}$$

Signals $\overline{\text{C INF}}$ and $\overline{\text{C IN}}$ are applied to AND gates 217, 214 and 210, each of which circuits are employed in an array to determine the C IN signal from the bit of lesser significance. The signal $\overline{S}_{10}$ from inverter 205 is applied to AND gates 210-218. Signal $G_3$ is applied to AND gates 211, 215 and 218. Signal $P_3$ is applied to AND gates 210, 214 and 217. Signal $G_2$ is applied to AND gates 212 and 216, Signal $P_2$ is applied to AND gates 210, 211, 214 and 215. Signal $G_1$ is applied to AND gates 213. Signal $P_1$ is applied to AND gates 210, 211 and 219. AND circuits 210-213 all serve as inputs to NOR circuit 220 whose output is the signal $\text{C IN}_1$, indicating the carry generated from the stage $A_1'$, $B_1'$. AND circuits 214-216 serve as inputs to NOR circuit 221 whose output is C $IN_2$. In like manner, AND circuits 217 and 218 serve as inputs to NOR circuit 222 whose output is signal C $IN_3$. Signal C $IN_3$ from NOR circuit 222 and the output from exclusive NOR circuit 208 serve as the inputs to exclusive NOR circuit 222 whose output is $\Sigma_2$. This signal is represented by:

$$\Sigma_2 = \overline{CIN}_3 \cdot \overline{G}_2 \cdot P_2 + \overline{CIN}_3 \cdot G_2 \cdot \overline{P}_2 + CIN_3 \cdot \overline{G}_2 \cdot \overline{P}_2 + CIN_3 \cdot G_2 \cdot P_2$$

This equation can be expressed in terms of input signals $A'_2$ and $B'_2$, but it becomes more complex and not necessary to describe this invention.

The signal C $IN_2$ from NOR circuit 215 and the output of exclusive NOR circuit 207 are inputs to exclusive NOR circuit 221 whose output is signal $\Sigma_1$. The signal is represented by:

$$\Sigma_1 = \overline{CIN}_2 \cdot \overline{G}_1 \cdot P_1 + \overline{CIN}_2 \cdot G_1 \cdot P_1 + CIN_2 \cdot \overline{G}_1 \cdot \overline{P}_1 + CIN_2 \cdot G_1 \cdot P_1$$

Signal C $IN_1$ from NOR circuit 200 and the output of exclusive NOR circuit 206 on the inputs to exclusive NOR circuit whose output is $\Sigma_0$, which signal is expressed as:

$$\Sigma_0 = \overline{CIN}_1 \cdot \overline{G}_0 \cdot P_0 + \overline{CIN}_1 \cdot G_0 \cdot \overline{P}_0 + CIN_1 \cdot \overline{G}_0 \cdot \overline{P}_0 + CIN_1 \cdot G_0 \cdot P_0$$

$\overline{C\ OUT}$ is a negated carry out signal for the bit-slice and is developed from AND circuits 253-256 being the inputs to NOR circuit 277 whose output is an input to AND circuit 262 which is gated by $\overline{S_{10}}$ which itself gates NOR circuit 263 whose other input is $\overline{C\ IN}$. The outputs of AND circuit 262 and NOR circuit 263 are inputs for NOR circuit 264 whose output is $\overline{C\ OUT}$. AND circuit 253 has a $G_0$ signal input; AND circuit 254 has $P_0$ and $G_1$ inputs. AND circuit 257 has as inputs signals $P_0$, $P_1$ and $G_2$; AND circuit 255 has as inputs $P_0$, $P_1$, $P_2$, $P_3$; AND circuit 256 has as inputs $P_0$, $P_1$, $P_2$, $P_3$, $\overline{C\ IN}$ and $\overline{C\ INF}$. The resultant $\overline{C\ OUT}$ signal is the $\overline{C\ IN}$ signal for the next most significant bit-slice.

Figure 4D:
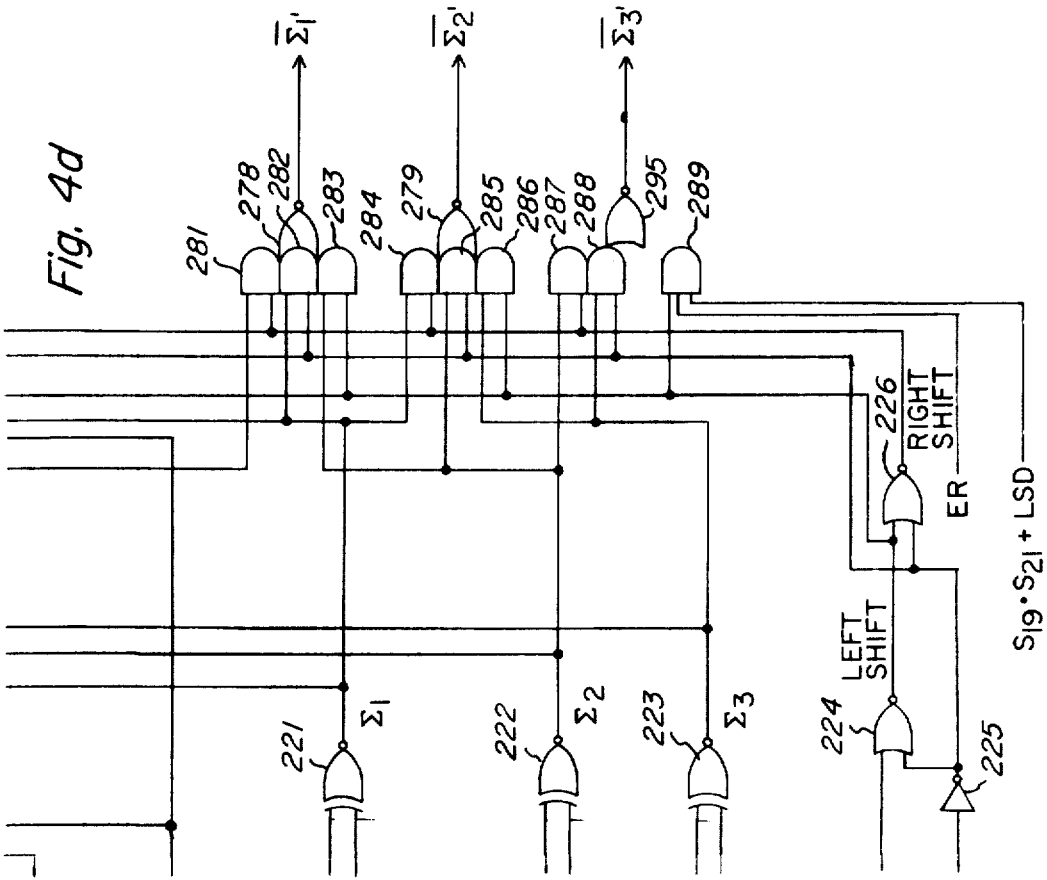
Figure 4A:
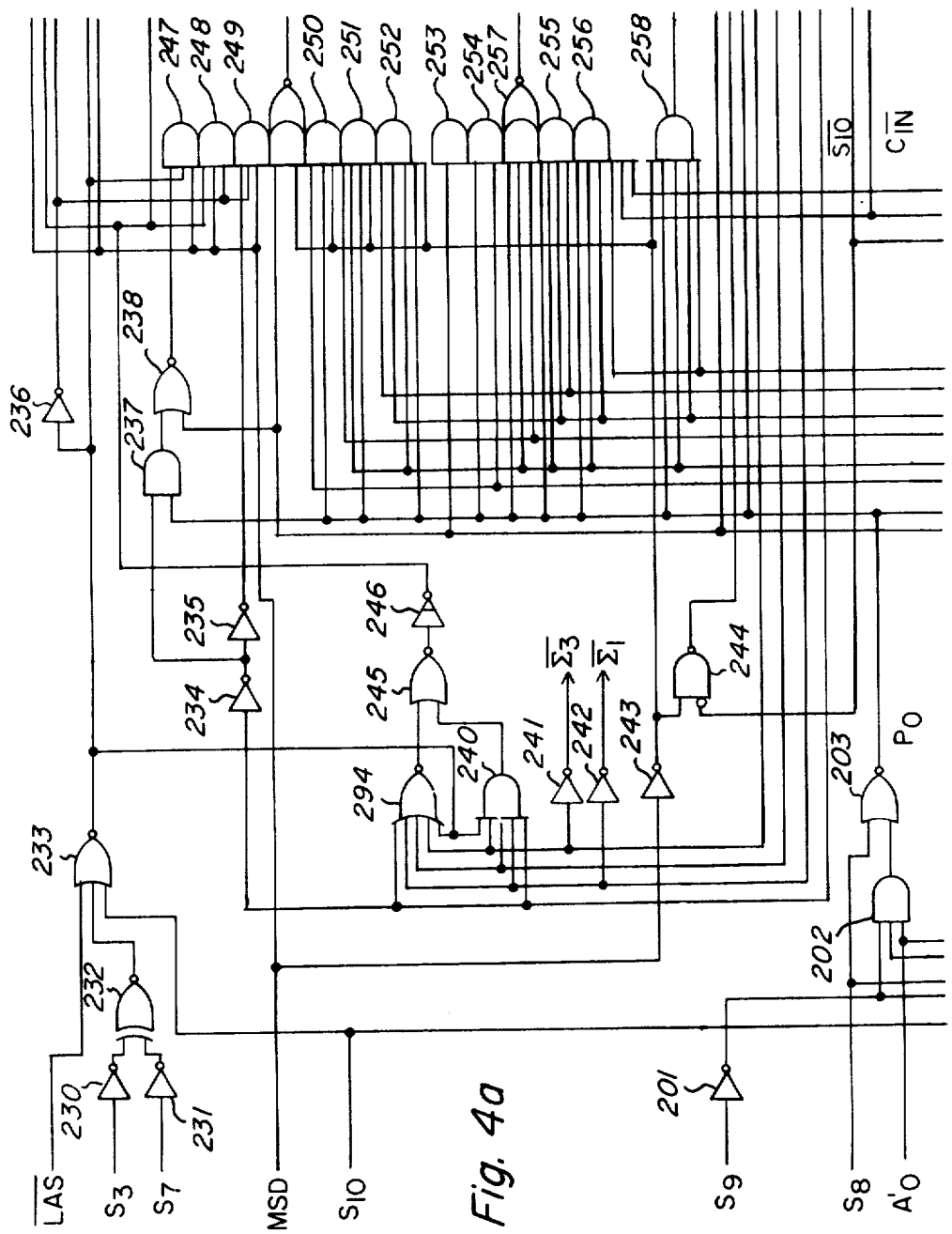
Figure 4B:
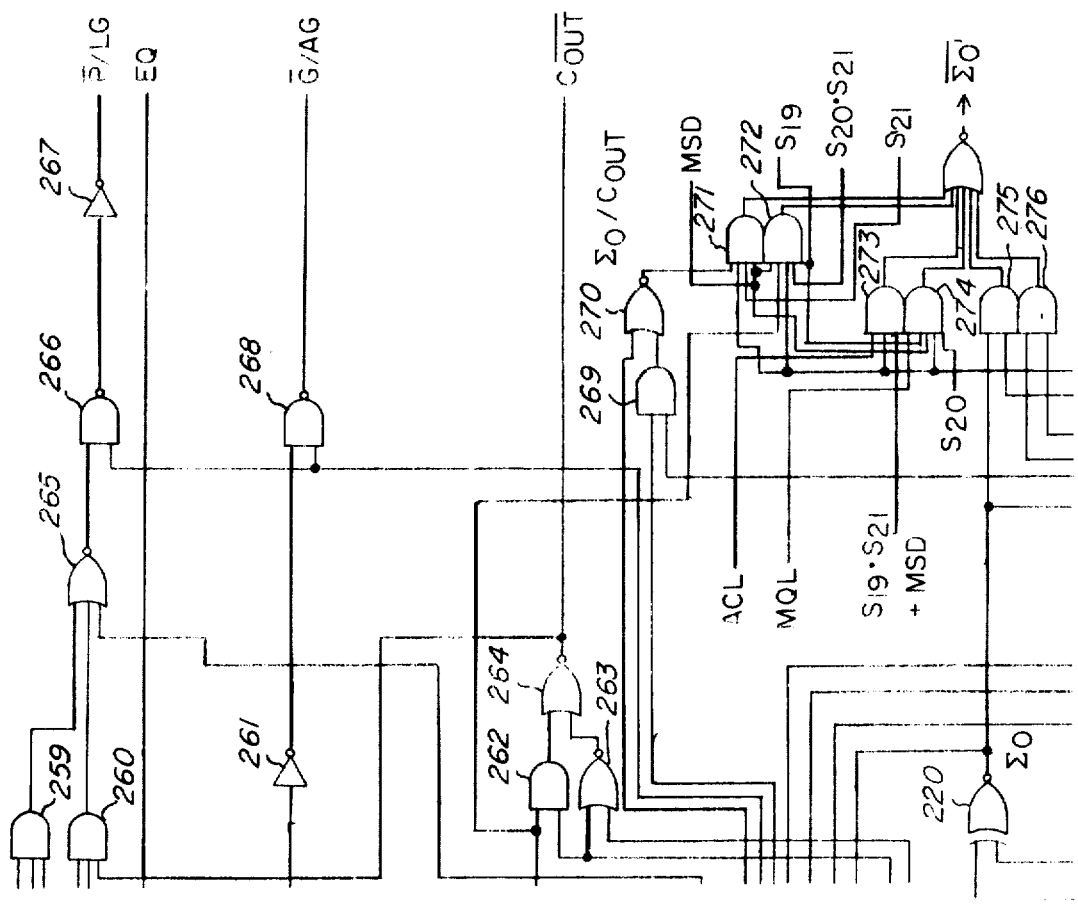
Figure 4C:
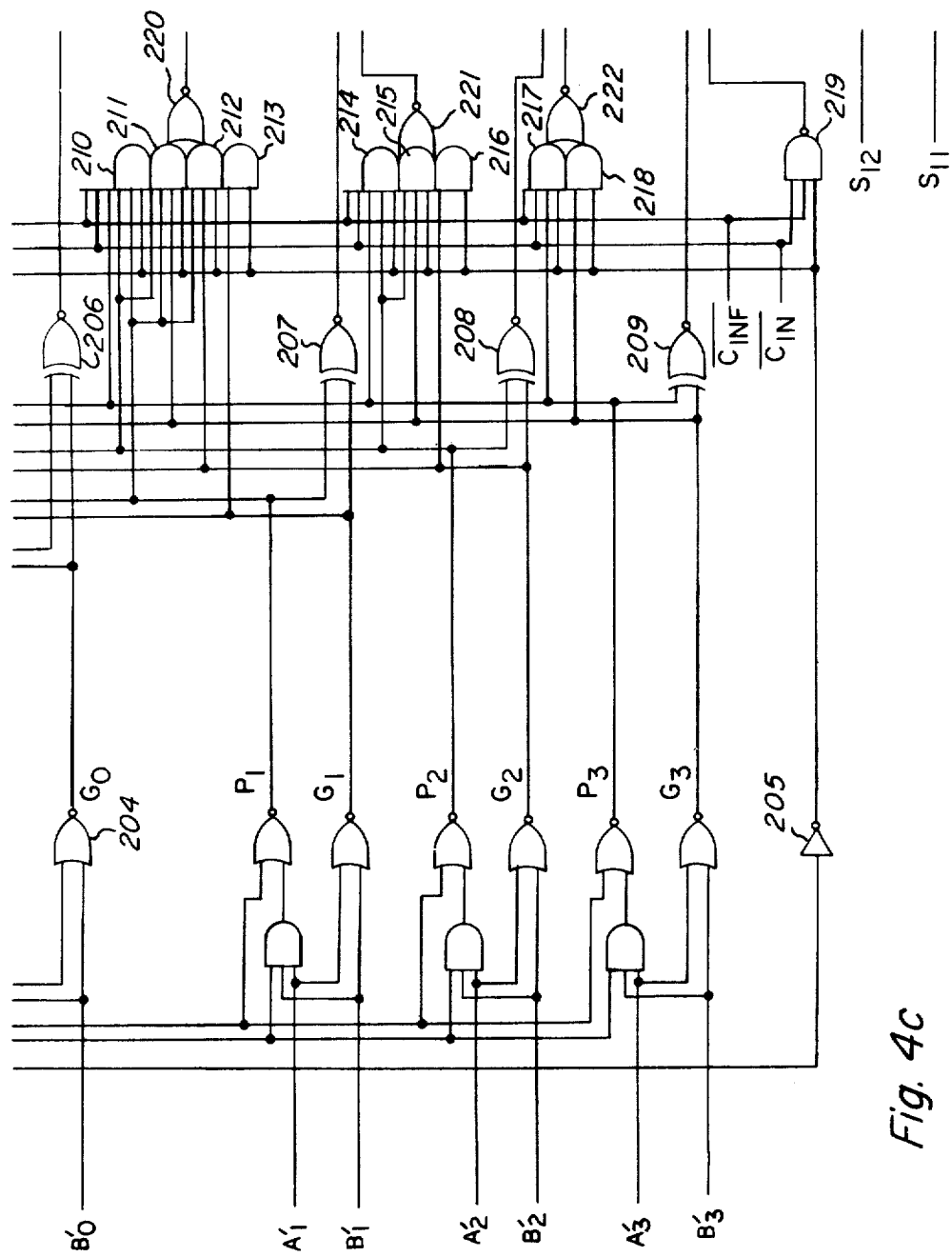

Next to be described is the sum bus 41 of FIG. 1, shown in detail in FIGS. 4b and 4d. Considering first the most significant bit $\Sigma_0$, the output of exclusive NOR circuit 220, it can be seen that such signal is applied to AND circuits 275 and 281. Signals $P_0$ from NOR circuit 203 and signal C $IN_1$ from NOR circuit 220 are the inputs to AND circuit 269 whose output is an input to NOR circuit 270, the other input to NOR circuit being signal $G_0$ from NOR circuit 204. The output of NOR circuit 270 is an input to AND circuit 271 which has the signal MSD as another input and control signal $S_{21}$ as still another input. AND circuit 272 also has signal MSD as an input and the output from NOR circuit 277 serves as an input as does an output from right shift NOR circuit 226. Control signals $\overline{S_{20} \cdot S_{21}}$ perform still another input. AND circuit 273 has an input from ACL from the signal $\overline{S_{19} \cdot S_{21}} + MSD$ and also from the output of NOR circuit 226. AND circuit 274 has an input from line MQL, from signal $S_{19}$, from signal MSD, from signal $S_{20}$ and from the output of NOR circuit 226. AND circuit 275 has a second input from the output of inverter 225 AND circuit 276 has an input from signal $\Sigma_1$ from the output of NOR circuit 221 and a left shift signal from the output of NOR circuit 224.

Note that AND circuits 271-274 are concerned with right shift while AND circuit 276 is concerned with the left shift and AND circuit 275 is concerned with a direct pass through of $\Sigma_0$. The outputs of all of AND circuits 271-276 serve as inputs to NOR circuit 291 whose output is $\overline{\Sigma'_0}$.

The control signals for left and right shift of the sum bus are $S_{11}$ and $S_{12}$, and $S_{11}$ being the input to inverter 225 and $S_{12}$ being one input to NOR circuit 224 whose other input is the output from inverter 225. Inverter 225 also serves as an input to NOR circuit 226 whose other input is the output of the left shift circuit, NOR gate 224. Another control input to the sum bus is the combination $S_{19}$ or $\overline{S}_{21}$ or LSD which serves as one input to left shift AND circuit 289 which has another input from line ACR and a left shift signal input from NOR circuit 224. PASS AND circuit 288 has an input from inverter 225 and $\overline{\Sigma}_3$ from exclusive NOR circuit 223. Right shift AND circuit 287 has a right shift signal input from NOR circuit 226 and signal $\Sigma_2$ from exclusive NOR circuit 222. AND circuits 287-289 all serve as inputs to NOR circuit 295 whose output is signal $\overline{\Sigma'}_3$. Left shift AND circuit 286 has a left shift signal input and input signal $\Sigma_3$. PASS AND circuit 285 has a signal from inverter 225 and a signal $\Sigma_2$. Right shift inverter 284 has a right shift signal input and a $\Sigma_1$ input. AND circuits 284-286 serve as inputs to NOR circuit 279 whose output is $\overline{\Sigma'}_2$. Left shift AND circuit 283 has a left shift signal input and signal $\Sigma_2$. PASS AND circuit 282 has a signal from the output of inverter 225 and also input $\Sigma_1$. Finally, right shift AND circuit 281 has a right signal input and a $\Sigma_0$ input. AND circuits 281-283 serve as inputs to NOR circuit 278 whose output is $\overline{\Sigma'}_1$. As is seen from this structure, the sum bus is capable of shifting by one bit either left or right and also is connected to other registers as will be evident in the description of operation to be described later.

Next to be described in detail is the compare and test logic 40 of FIG. 1. NOR circuit 233 has an LAS (left arithmetic shift) input. Control signals $S_3$ (A complement) and control signals $S_7$ (B complement) serve as inputs to inverters 230 and 231 respectively whose outputs are inputs to exclusive NOR circuit 232. The output of circuit 232 serves as an input to NOR circuit 233 whose third input is provided by control signal $S_{10}$. The output of NOR circuit 233 serves as an input to inverter 236, AND circuit 260, NOR circuit 289 and AND circuit 240. AND circuit 260 has an input from NOR circuit 264 and signal MSD. AND circuit 259 has an input signal MSD and an input signal from open collector inverter 246 which is the EQ (equal) signal indicating that $\Sigma_0$-$\Sigma_3$ are all "1's" or all "0's". The outputs of AND circuits 259 and 260 are inputs to NOR circuits 265 which has a third input from AND circuit 258 whose inputs are signal $P_0$-$P_3$ and signal $\overline{MSD}$ from inverter 243. NAND circuit 244 has signal $\overline{MSD}$ as an input from inverter 243 and signal $S_{10}$ with its output connected to the input of NAND circuit 266 whose other input comes from the output of NOR circuit 265. The output of NAND circuit 266 is inverted through inverter 267 and is output signal $\overline{P}/LG$. NOR circuit 294 and AND circuit 240, in addition to their inputs from the outputs of NOR circuit 233, each have as inputs signals $\Sigma_0$-$\Sigma_3$ and both of whose outputs are inputs to NOR circuits 245 which is an input to open collector inverter 246. The open collector wired-AND circuit is well known in the art and enables output connections to perform logic that otherwise would require additional circuits. The output of inverter 246 is one input to AND circuit 248. Signal MSD is another input and the output of inverter 236 is still another input to AND circuit 248. AND circuit 249 has as inputs, signal MSD, the output of inverter 235, and the output of inverter 236. AND circuit 292 has as inputs signal $G_1$, $P_0$ and $\overline{MSD}$. AND circuit 251 has as inputs signals $P_0$, $P_1$, $G_2$ and $\overline{MSD}$. AND circuit 252 has as input signals $P_0$, $P_1$, $P_2$, $G_3$ and $\overline{MSD}$. AND circuits 247 and 252 and 292 are all inputs to NOR circuit 292 whose output is inverted through inverter 261 and serves as an input to NAND circuit 268. The output of NAND circuit 268 is output signal $\overline{G/AG}$.

Figure 5A:
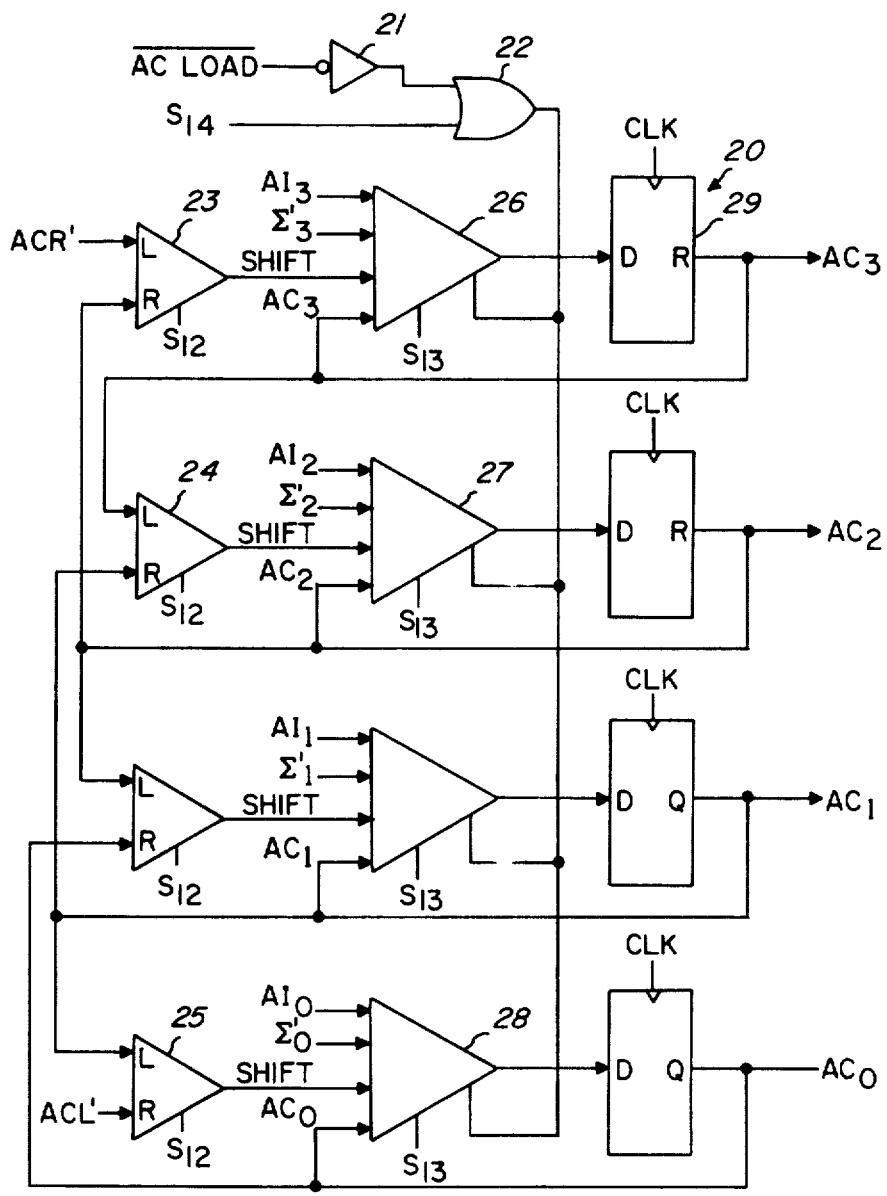
FIG. 5a is a schematic diagram of the AC register of FIG. 1.

FIG. 5a illustrates detail of the accumulator 20 of FIG. 1. External function signal $\overline{AC\ LOAD}$ is inverted by inverter 21 and is an input to OR circuit 22 whose other input is command signal $S_{14}$. The output of OR circuit 22 gates multiplexers 26-28 and one other identical multiplexer. Multiplexer 23 has as inputs signal ACR' and signal $AC_2$, controlled by command signal $S_{12}$. The output shift signal from device 23 is an input to multiplexer 26 which is further controlled by control signal $S_{13}$ and has inputs $AC_3$, $\Sigma_3$ and $AI_3$. Multiplexer 26 has an output which provides an input to flip flop 29 which has an external clock input and whose output serves as the "1" input to shift multiplexer 24 whose "R" input is signal $AC_1$. Flip flop 29, together with its associated circuitry shift multiplexer 23 and multiplexer 26 is identical, except for arrangement of inputs with stages of lesser significance each having the identical three components and providing output signals $AC_2$, $AC_1$ and $AC_0$, respectively.

Figure 5B:
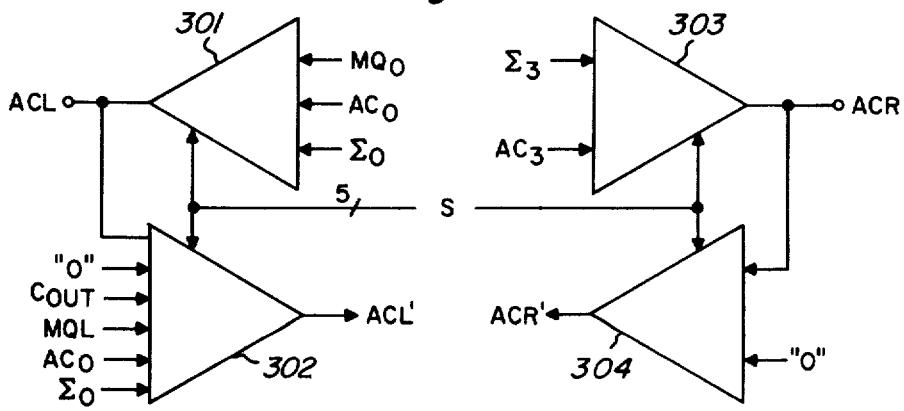
FIG. 5b is a schematic diagram of the shift logic of the AC register.

FIG. 5b illustrates multiplexer 301 having input $MQ_0$, (the most significant bit of the MQ register 30); $AC_0$ (the most significant bit of the AC register 20); $\Sigma_0$ (the most significant bit of the sum bus 41). The output of multiplexer 301 is connected to line ACL and to the input of multiplexer 302.

Multiplexer 302 also has "0" input; "COUT" input; MQL line input; $AC_0$ input and $\Sigma_0$ input. Multiplexer 302 provides output signal ACL'.

Multiplexer 303 has inputs $\Sigma_3$ (least significant bit of the sum bus 41) and $AC_3$ (least significant bit of accumulator register 20, and provides an output on line ACR as an input to multiplexer 304. Multiplexer 304 also has a "0" input and provides output signal ACR'.

All of multiplexers are controlled by control signals $S_{11}$, $S_{12}$, $S_{19}$, $S_{20}$ and $S_{21}$, depending upon the shift mode that is selected.

The ACR line from the LSD bit slice of the AC register 20 is externally connected to the ACL line of the MSD register.

The various combinations of the control signals $S_{11}$, $S_{12}$, $S_{19}$, $S_{20}$ and $S_{21}$ and the resultant shift modes are set out later.

The stage providing $AC_2$ is identical to that providing $AC_3$ except that the inputs as described to multiplexer 24 are different and the inputs to multiplexer 27 are $AI_2$, $\Sigma'_2$, the output of multiplexer 24 and $AC_2$. The stage providing the output $AC_1$ is identical to that providing $AC_2$ except for the inputs to the shift multiplexer being from $AC_0$ and $AC_2$ and the inputs to the second multiplexer being $AI_1$, $\Sigma'_1$ and $AC_1$ in addition to the shift input. The lowest order stage providing $AC_0$ has as an input ACL' to the "R" input and signal $AC_1$ to the L input of multiplexer 25 whose output, along with signal $AC_0$, $AI_0$, $\Sigma'_0$ are inputs to multiplexer 28 whose output goes through a flip flop identical to flip flop 29 which has an output signal $AC_0$.

FIG. 6 represents the multiplexer/quotient register 30 in detail. It is very much like the accumulator described above having four identical stages, differing only in the inputs. The stage providing $MQ_3$ which is the least significant bit has a multiplexer 31 controlled by control signal $S_{12}$ which controls identical input stages to the three remaining bits. Multiplexer 31 has for its "L" input signal MQR' and for its "R" input signal $MQ_2$. Its output goes to multiplexer 32 as an input, whose other inputs are $\Sigma'_3$ and signal $MQ_3$. Its output is controlled by control signals $S_{15}$ and $S_{16}$ which also serve to control the multiplexers of the three remaining bits. The output of multiplexer 32 serves as a D input to flip flop 33 whose Q output is signal $MQ_3$ and which serves as the "L" input to the next stage. The next stages are identical and at the most significant bit, which is that providing output signal $MQ'_0$, signal MQL' is the "R" input signal and is the only difference from the preceding bits.

Figure 7:
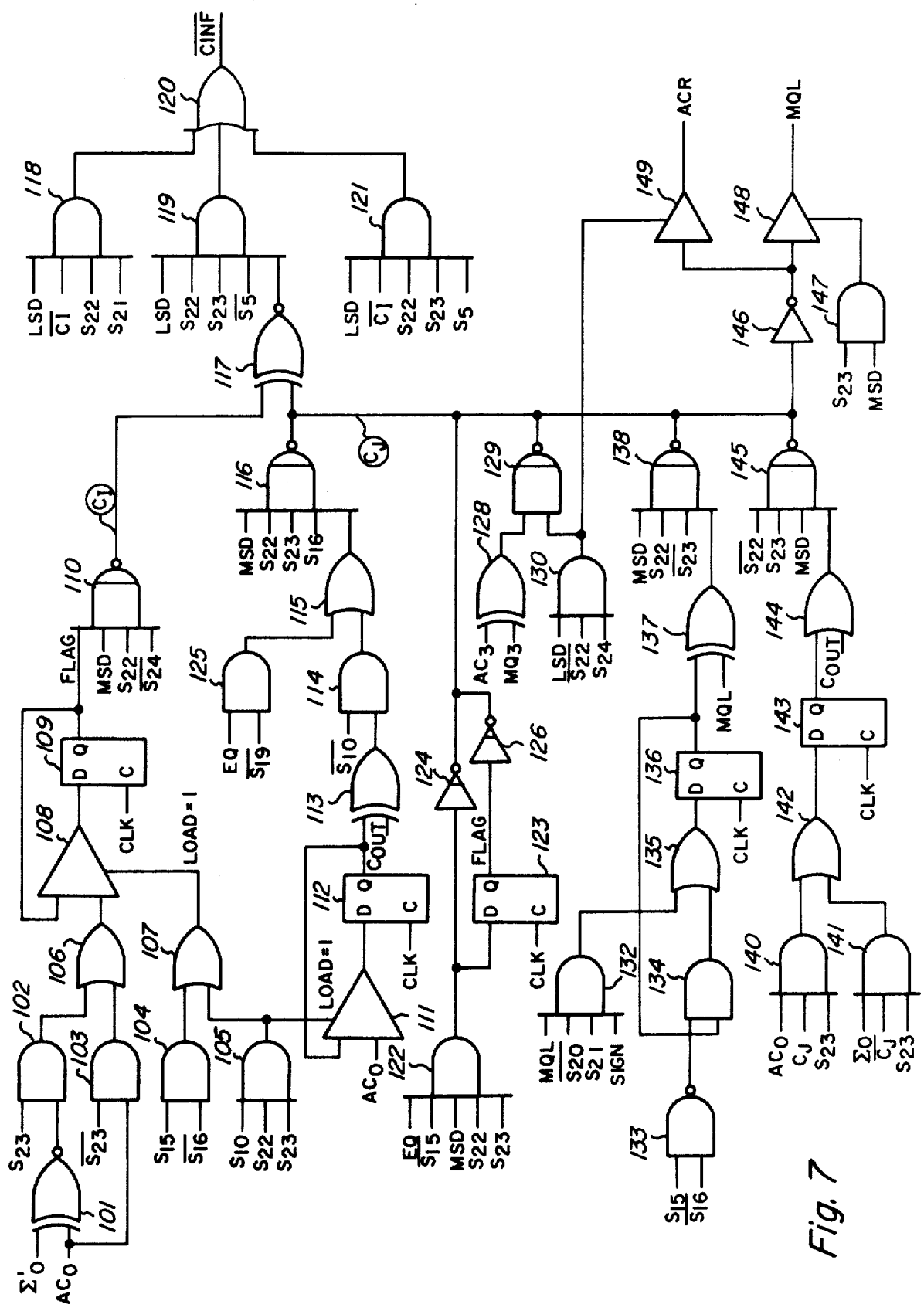
FIG. 7 is a logic diagram of the control logic portion of control logic and PLA 100 of FIG. 1.

FIG. 7 illustrates the control logic portion of control logic and PLA 100 shown in FIG. 1. This control logic provides signals $C_I$ and $C_J$ as well as the forced carry in signal $\overline{C\ INF}$. The circuitry will be described in detail and its operation will be described in connection with examples of the operation of the bit-slice that will follow.

Signals $\Sigma'_0$ and $AC_0$ are inputs to exclusive NOR gate 101 which has an output to AND gate 102 which itself has another input, control signal $S_{23}$. $AC_0$ input signal also is an input to AND circuit 103 whose other input is $\overline{S_{23}}$. The outputs of AND circuits 102 and 103 are inputs to OR circuit 106 which is one input to tristate device 108. Command control signals $S_{15}$ and $\overline{S_{16}}$ are inputs to AND circuit 104 whose output is an input to OR circuit 107. Control signals $S_{10}$, $S_{22}$ and $S_{23}$ are inputs to AND circuit 105 whose output is an input to OR circuit 107. The output of OR circuit 107 is the control for multiplexer 108. The output of multiplexer 108 is the D input to flip flop 109 which has an external clock input and whose output serves as a second input to multiplexer 108 and also as an input to open collector NAND circuit 110. The other inputs to NAND circuit 110 are signal MSD and control signals $S_{22}$ and $\overline{S_{24}}$. The output of NAND circuit 110 is the signal $C_I$.

Signal $AC_0$ is an input to multiplexer 111 whose output is the D input to flip flop 112, having an external clock input and having an output which is the second input to multiplexer 111 and which also is an input to NOR circuit 113. The output of NOR circuit, together with control circuit $\overline{S_{10}}$, serves as input to AND circuit 114 which is an input to NOR circuit 115. AND circuit 125 has signal EQ as one input and the control signal $\overline{S_{19}}$ as the other. The output of AND circuit 125 is the second input to OR circuit 115 which has an output serving as an input to open collector NAND circuit 116. The other inputs to NAND circuit 116 are signal MSD and control signals $S_{16}$, $S_{22}$ and $S_{23}$. The output of NAND circuit 116 is the signal $C_J$. AND circuit 122 has EQ signal as one input, signal MSD as another input and control signals $S_{15}$, $S_{22}$ and $S_{23}$ as the remaining inputs. Its output is the D input to flip flop 123 and also is an input to open collector inverter 124. The output of flip flop 123 is an input to open collector inverter 126 whose output and that of open collector inverter 124 also provides the $C_J$ output. AND circuit 132 has as inputs the SIGN signal, the MQL line, and control signals $\overline{S_{20}}$ and $S_{21}$. NAND circuit 133 has as inputs control signals $S_{15}$ and $S_{16}$ and has an output which is an input to AND circuit 134. AND circuit 134 has an output to the input of OR circuit 135 whose other input comes from AND circuit 132. OR circuit 135 has an output which is the D input to flip flop 136 which has an external clock input and whose Q output is the second input to AND circuit 134. This second output is one input to exclusive OR circuit 137 whose other input is the MQL line. The output of exclusive OR circuit 137 is an input to open collector NAND circuit 138. The other inputs to NAND circuit 138 are signal MSD and control signals $S_{22}$ and $S_{23}$. The output of NAND circuit 138 is $C_J$.

AND circuit 140 has input signals $A_0$, $C_J$ and $S_{23}$. AND circuit 141 has as inputs signals $\Sigma_0$, $\overline{C_J}$ and $S_{23}$. The outputs of AND circuits 140 and 141 are inputs to OR circuit 142 whose output is the D input of flip flop 143 which has an external clock input. The Q output of flip flop 143 is an input to OR circuit 144 whose second input is the C OUT signal from the arithmetic unit 200 described in FIG. 4. The output of OR circuit 144 is an input to open collector NAND circuit 145 whose other inputs are signals MSD and control signals $\overline{S_{22}}$ and $S_{23}$. The output of NAND circuit 145 is signal $C_J$. Exclusive NOR circuit 117 has as inputs signals $C_I$ from open collector NAND circuit 110 and $C_J$ from open collector NAND circuits 116, 129, 138 and 145. The output of exclusive NOR circuit 117 is an input to AND circuit 119 whose other inputs are signals LSD and control signals $\overline{S_5}$, $S_{22}$ and $S_{23}$. AND circuit 118 has as inputs the signals LSD, $C_I$, and control signals $S_{21}$ and $S_{22}$. AND circuit 121 has, as inputs, signals LSD and $\overline{C_I}$ and control signals $S_5$, $S_{22}$ and $S_{23}$. AND circuits 118, 119, and 121 are inputs to OR circuit 120 providing the forced carry-in signal $\overline{C\ INF}$.

Inverter 146 has an input signal $C_J$ and its output provides inputs to 3-state devices 148 and 149 whose outputs are connected to lines MQL and ACR, respectively. AND circuit 147 has input signals MSD and $S_{23}$ and has an output which is the control for 3-state device 148. The control for 3-state device 149 is provided by AND circuit 130.

MODE OF OPERATION

Figure 8:
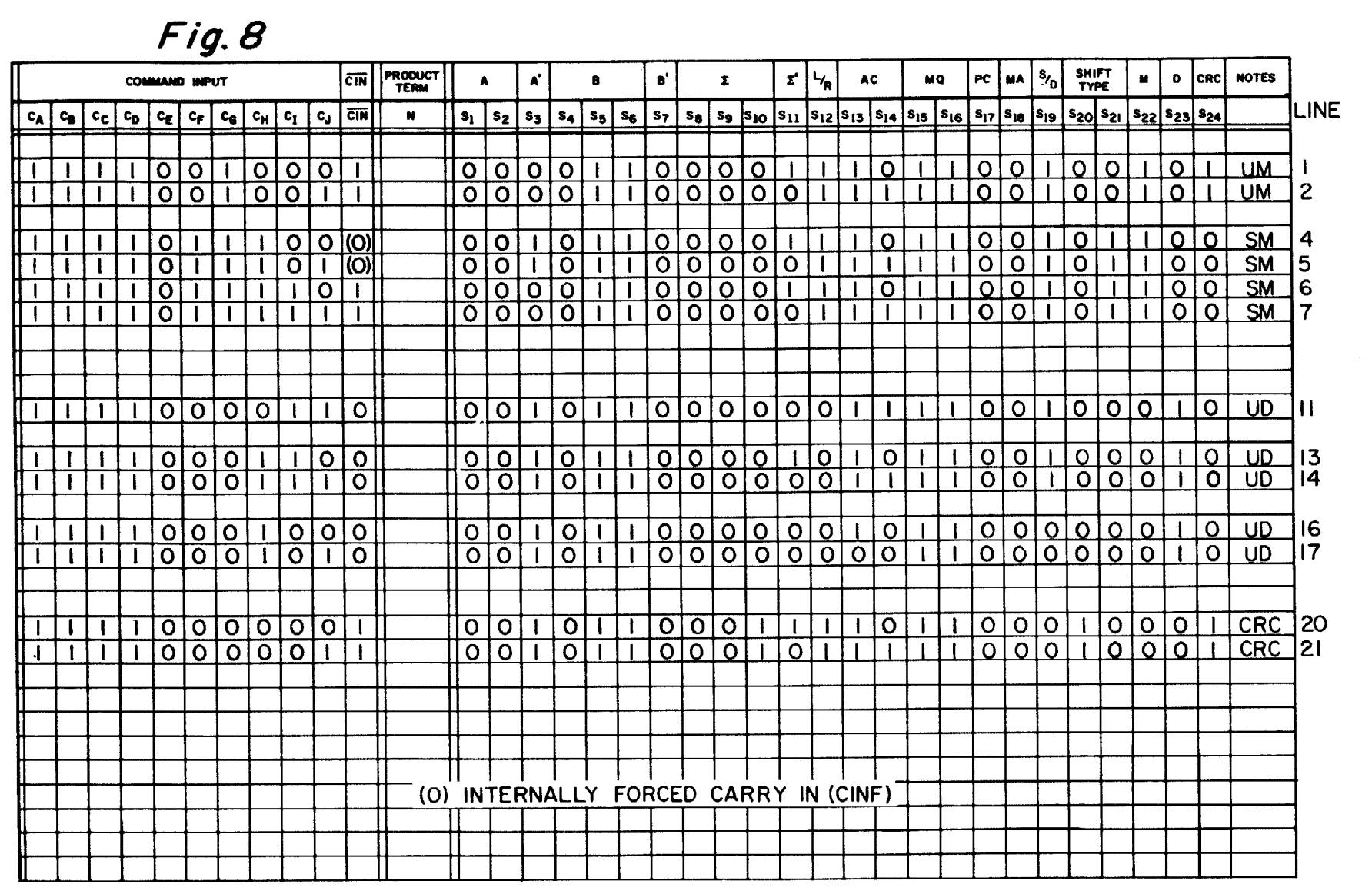
Figure 9:
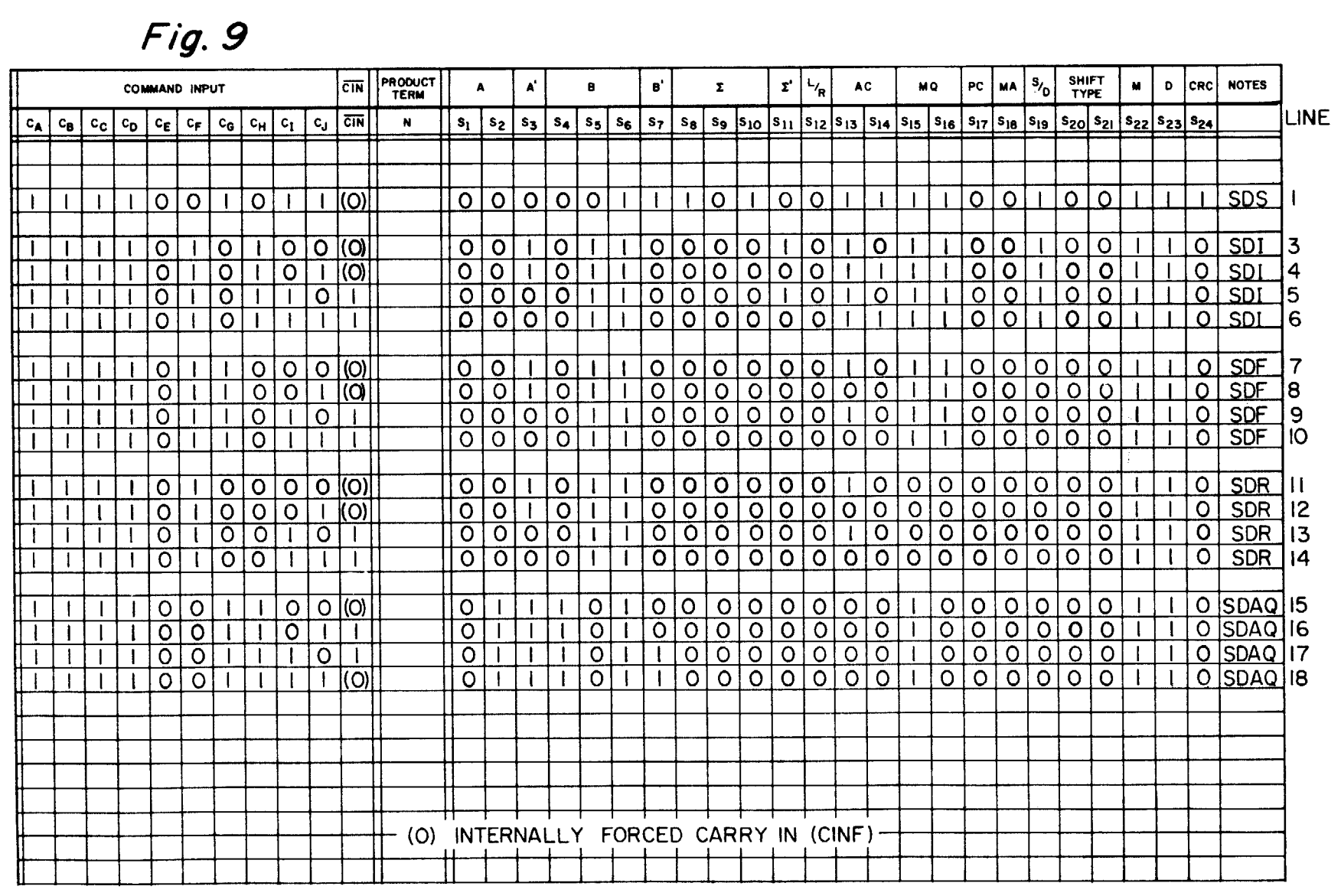
Figure 15:
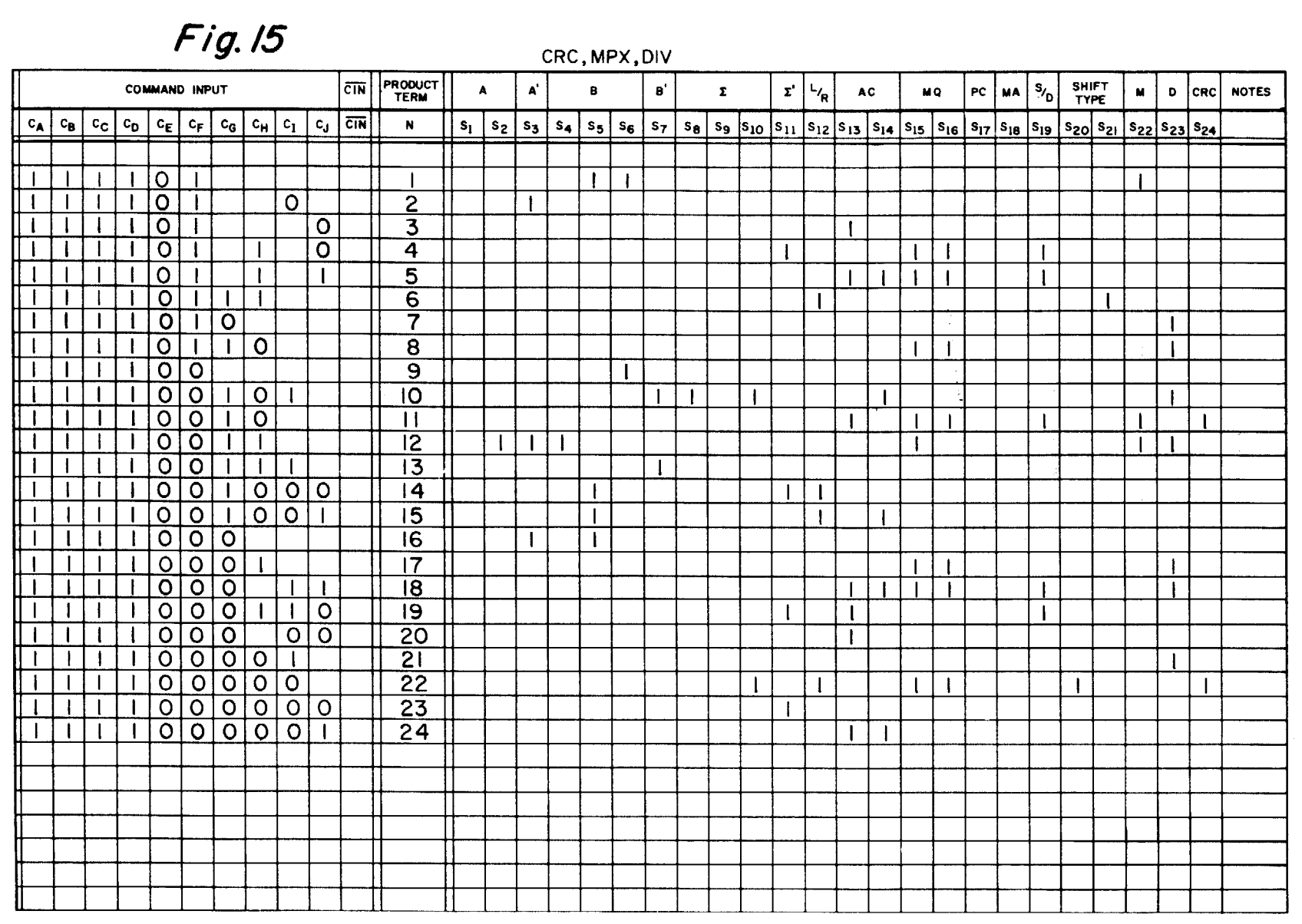

FIG. 8 illustrates a portion of the PLA of control logic and PLA 100 of FIG. 1. FIG. 8 does not represent the actual map of the PLA but is shown to more readily describe the operation. The actual map of the repetitive algorithms, namely unsigned multiply, signed multiply, unsigned divide, signed divide and cyclical redundancy character generation is shown in FIG. 15. FIG. 9 illustrates the PLA for the signed divide algorithm. The command inputs $C_4-C_J$ and the signal $\overline{C\ IN}$ are shown on the left of FIGS. 8 and 9. The control signals $S_1-S_{24}$ are shown to the right. To understand the operation of the invention, the functions of the control signals $S_1-S_{24}$ are set out as follows:

| A MULTIPLEXER | | $S_1$ | $S_2$ | |
|---|---|---|---|---|
| One's | XFER to A | 0 | 1 | |
| AI | XFER to A | 0 | 0 | |
| BI | XFER to A | 1 | 0 | |
| AC | XFER to A | 1 | 1 | |
| A COMPLEMENT | | $S_3$ | | |
| A | XFER to A' | 0 | | |
| $\overline{A}$ | XFER to A' | 1 | | |
| B MULTIPLEXER | | $S_4$ | $S_5$ | $S_6$ |
| One's | XFER to B | 0 | 0 | 0 |
| PC | XFER to B | 1 | 1 | 1 |
| AC | XFER to B | 0 | 1 | 1 |
| MQ | XFER to B | 0 | 1 | 1 |
| BI | XFER to B | 0 | 0 | 0 |
| BI . PC | XFER to B | 1 | 1 | 0 |
| BI . AC | XFER to B | 0 | 1 | 0 |
| BI . MQ | XFER to B | 1 | 0 | 0 |
| B COMPLEMENT | | $S_7$ | | |
| B | XFER to B' | 0 | | |
| $\overline{B}$ | XFER to B' | 1 | | |
| ADDER | | $S_8$ | $S_9$ | $S_{10}$ |
| A' NOR B' | | 0 | 1 | 1 |
| A' OR B' | | 1 | X | 1 |
| A' $\ominus$ B' | | 0 | 0 | 1 |
| A' + B' + CIN, XFER to $\Sigma$ | | 0 | 0 | 0 |
| $\Sigma$ SHIFT | | $S_{11}$ | $S_{12}$ | |
| PASS | | 0 | X | |
| LEFT | | 1 | 0 | |
| RIGHT | | 1 | 1 | |
| AC | | $S_{13}$ | $S_{14}$ | |
| AC XFER to AC | | 0 | 1 | |
| AI XFER to AC | | 0 | 1 | |
| $\Sigma'$ XFER to AC | | 1 | 0 | |
| AC SHIFT XFER to AC | | 1 | 1 | |
| MQ | | $S_{15}$ | $S_{16}$ | |
| MQ XFER to MQ | | 0 | 0 | |
| NOT USED | | 0 | 1 | |
| $\Sigma$ XFER TO MQ | | 1 | 0 | |
| MQ SHIFT, XFER to MQ | | 1 | 1 | |
| SHIFT CONTROLS | | | | |
| RIGHT/LEFT CONTROL | | $S_{12}$ | | |
| SHIFT LEFT | | 0 | | |
| SHIFT RIGHT | | 1 | | |
| SINGLE/DOUBLE LENGTH | | $S_{19}$ | | |
| SINGLE LENGTH | | 0 | | |
| DOUBLE LENGTH | | 1 | | |
| SHIFT MODE | | $S_{20}$ | $S_{21}$ | |
| LOGICAL | | 0 | 0 | |
| ARITHMETIC | | 0 | 1 | |
| ROTATE | | 1 | 1 | |
| NOT USED | | 1 | 1 | |
| CRC CONTROL | | $S_{24}$ | | |
| DISABLE AUTOMATIC CRC CONTROL | | 0 | | |
| ENABLE AUTOMATIC CRC CONTROL | | 1 | | |
| MULTIPLY/DIVIDE CONTROL | | $S_{22}$ | $S_{23}$ | |
| DISABLE AUTOMATIC CONTROL | | 0 | 0 | |
| UNSIGNED DIVIDE | | 0 | 1 | |
| UNSIGNED AND SIGNED MULTIPLY | | 1 | 0 | |
| SIGNED DIVIDE | | 1 | 1 | |

The operation of other controls shown in FIG. 1 is as follows:

| BI/O CONTROL | $\overline{ENBO}$ | |
|---|---|---|
| $\Sigma'$ XFER to BI/O | 0 | |
| BI/O OPEN | | |

| | PC | MA |
|---|---|---|
| PC AND MA COUNTERS | PC INCR | $S_{17}$ MA INCR $S_{18}$ |
| NOT USED | 1 0 | 1 0 |
| PC/MA XFER to PC/MA | X 1 | X 1 |
| COUNT | 0 0 | 0 0 |
| DO | SEL DO1 | SEL DO2 |
| OPEN | 1 | 1 |
| AC XFER to DO | 0 | 1 |
| MQ XFER to DO | 1 | 0 |
| $\Sigma'$ XFER to DO | 0 | 0 |
| AO | SEL AO | |
| MA XFER to AO | 0 | |
| PC XFER to AO | 1 | |

As an example of the operation, consider first the generation of the cyclical redundancy character as shown at lines 20 and 21 on FIG. 8. Generation of the cyclical redundancy character is done to check the accuracy of a string of data words usually in the form of eight bit words, known as bytes. The cyclical redundancy character is an arbitrary and satisfactory method of checking the accuracy of the message.

Consider the command input for the generation of the cyclical redundancy character (CRC).

| $C_A$ | $C_B$ | $C_C$ | $C_D$ | $C_E$ | $C_F$ | $C_G$ | $C_H$ | $C_I$ | $C_J$ | $\overline{CIN}$ |
|---|---|---|---|---|---|---|---|---|---|---|
| 1 | 1 | 1 | 1 | 0 | 0 | 0 | 0 | 1 | 1 | |

The resultant control signals that equal 1 are $S_3$, $S_5$, $S_6$, $S_{10}$, $S_{12-16}$, $S_{20}$ and $S_{24}$. The other S control signals all equal 0. These control signals cause the arithmetic logic unit bit-slice to function in certain prescribed ways:

| $S_1$ | $S_2$ | | |
|---|---|---|---|
| 0 | 0 | | AI XFER to A |
| $S_3$ | | | |
| 1 | | | $\overline{A}$ XFER to A |
| $S_4$ | $S_5$ | $S_6$ | |
| 0 | 1 | 1 | AC XFER to B |
| $S_7$ | | | |
| 0 | | | B XFER to B' |
| $S_8$ | $S_9$ | $S_{10}$ | |
| 0 | 0 | 1 | A' ⊖ B' XFER to Σ |
| $S_{11}$ | $S_{12}$ | | |
| 0 | 1 | | Σ XFER to Σ' |
| $S_{12}$ | | | |
| 1 | | | SHIFT RIGHT |
| $S_{13}$ | $S_{14}$ | | |
| 1 | 1 | | AC SHIFT XFER to AC |
| $S_{15}$ | $S_{16}$ | | |
| 1 | 1 | | MQ SHIFT XFER to MQ |
| $S_{17}$ | | | |
| 0 | | | PC XFER to PC |
| $S_{18}$ | | | |
| 0 | | | MA XFER to MA |
| $S_{19}$ | | | |
| 0 | | | SINGLE LENGTH SHIFT |
| $S_{20}$ | $S_{21}$ | | |
| 1 | 0 | | ROTATE SHIFT |
| $S_{22}$ | $S_{23}$ | | |
| 0 | 0 | | DISABLE MULTIPLY DIVIDE CONTROL |
| $S_{24}$ | | | |
| 1 | | | ENABLE AUTOMATIC CRC CONTROL |

Figure 10:
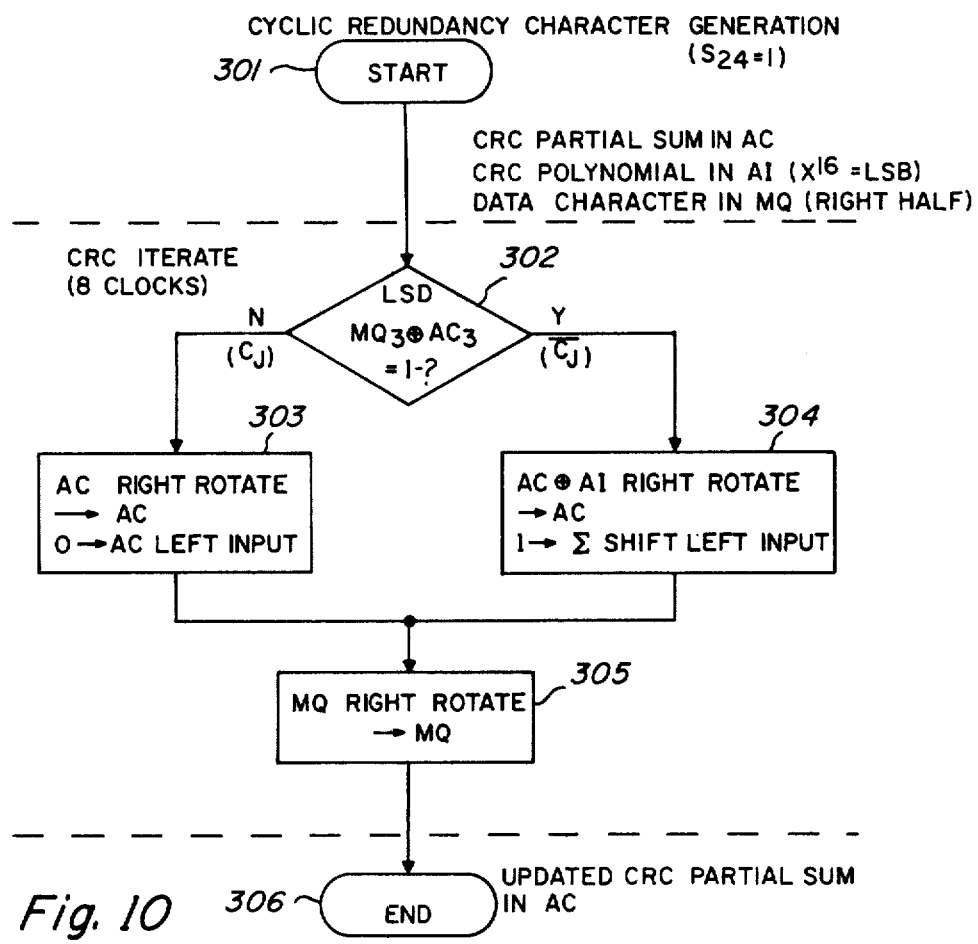
FIG. 10 is a flowchart illustrating the working of the cyclic redundancy character generation algorithm.

In addition to FIG. 8, also please refer to FIG. 10 which is a flowchart indicating the operation of the CRC generation. The CRC generation algorithm is started at block 301 by the user placing the correct command inputs as illustrated above on the input lines of the bit-slice. Also, he must have a CRC polynomial as the A input (AI). This polynominal is a constant which specifies a particular type of check code. The CRC partial sum is carried in the accumulator 20. The particular data character is held in MQ and during this algorithm is transferred from the right half (the least significant half) to the left half of MQ merely for purposes of preserving the data character as its individual bits are examined. Proceeding to block 302, the least significant digit of registers MQ and ac are considered and specifically the least significant bit of each, that is, $MQ_3$ and $AC_3$ are exclusively ORed together to determine whether the result is =1. Note that the S control bits set out above call for AI (the polynomial) to go to A and for A to be inverted. Also, the shift is a rotating shift and of single length. Assume that the output of exclusive OR circuit 128 of FIG. 7=0. Then signal $C_J$ remains a 1 and register AC rotates to the right. AND circuit 130 has as inputs, the binary signal LSD from FIG. 3B signifying the least significant digit, $\overline{S_{22}}$ and $S_{24}$. The least significant digit is selected by reason of the LSD signal, $S_{22}=0$ from the original command input, and $S_{24}=1$ from the original command input. Therefore, the output of AND circuit 130 = 1 and provides a gate for 3-state element 149 thereby gating in the output of inverter 146 into the ACR line. The output of inverter 146 is $\overline{C_J}=0$ and therefore "0" is gated in on ACR which, as shown in FIG. 5a, supplies the signal ACR' to the "L" input of the least significant bit $AC_3$ of the accumulator 20.

Referring back to FIG. 10, it can be seen that the operations of block 303 are thereby performed. Also, the operation of block 305, namely, that of rotating the contents of the register to the right is also performed.

The next pair of bits from register MQ and AC are exclusively ORed by exclusive OR gate 128 of FIG. 7.

As before, the output of AND circuit 130=1 and now the output of exclusive OR circuit 128 also=1. Therefore, the output open collector NAND gate 129, which is $C_J$ then=0. When $C_J=0$, the resulting S control output signals from the PLA change. Specifically, $S_{11}=1$ and $S_{14}=0$. Then:

| $S_{11}$ | $S_{12}$ | |
|---|---|---|
| 1 | 1 | Σ XFER to Σ'<br>R |
| $S_{11}$ | $S_{14}$ | |
| 1 | 0 | Σ' XFER to AC |

As indicated earlier, the original CRC command input resulted in output control signals which caused the exclusive ORing of AC and AI. The new control signals (as shown at line 20 of FIG. 8) also indicate that Σ shifted to the right is transferred to Σ'. Also, a "1" is entered into the most significant bit of Σ'. This is accomplished as shown in FIG. 7. With $C_J=0$, the output of inverter 146=1 and that output signal is gated through 3-state device 149 to the line ACR. It will be recalled that the line ACR is connected to the line ACL and therefore the "1" impressed on ACR from device 149, in a right shift mode, is entered on ACL as signal ALR'. Σ' now contains the shifted exclusive OR of the new partial sum and a "1" in the most significant bit position. Then this number is transferred into the accumulator 20 by reason of the new combination of control signals as indicated above. The operations performed are those indicated in block 304. The MQ right rotate of block 305 is again performed so that two bits of the original data character are in the most significant positions of MQ while six bits remain in the least significant positions.

The next pair of bits from $MQ_3$ and $AC_3$ may produce $C_J=1$ or $C_J=0$. The operations that follow are identical to those described above, depending upon the resultant state of $C_J$. This operation is performed eight times (eight clocks) at the end of which the updated cyclic redundancy character will be totally within the accumulator 20 and the original data character in the multiplier/quotient register 30 will be shifted to the left half. In this manner, the data character is preserved.

A more familiar algorithm, perhaps, is the unsigned multiply. An explanation of its operation may also be helpful in understanding this invention. When the user designates an unsigned multiply, the following input command signals and resultant control signals are as follows:

UNSIGNED MULTIPLY

| $C_A$ | $C_B$ | $C_C$ | $C_D$ | $C_E$ | $C_F$ | $C_G$ | $C_H$ | $C_I$ | $C_J$ | $\overline{CIN}$ |
|---|---|---|---|---|---|---|---|---|---|---|
| 1 | 1 | 1 | 1 | 0 | 0 | 1 | 0 | 0 | 1 | 1 |

$S_5, S_6, S_{12}-S_{16}, S_{19}, S_{21}, S_{22} = 1$

| $S_1$ | $S_2$ | | AI → A |
|---|---|---|---|
| 0 | 0 | | |
| $S_3$ | | | |
| 0 | | | A → A' |
| $S_4$ | $S_5$ | $S_6$ | AC → B |
| 0 | 1 | 1 | |
| $S_7$ | | | |
| 0 | | | B → B' |
| $S_8$ | $S_9$ | $S_{10}$ | |
| 0 | 0 | 0 | A' plus B' plus CIN → Σ' |
| $S_{11}$ | $S_{12}$ | | |
| 0 | 1 | | Σ pass → Σ' and Shift Right |
| $S_{13}$ | $S_{14}$ | | |
| 1 | 1 | | AC SHIFT → AC |
| $S_{15}$ | $S_{16}$ | | |
| 1 | 1 | | MQ SHIFT → MQ |
| $S_{17}$ | $S_{18}$ | | |
| 0 | 0 | | PC AND MA COUNT |
| $S_{19}$ | | | |
| 1 | | | DOUBLE LENGTH SHIFT |
| $S_{20}$ | $S_{21}$ | | |
| 0 | 0 | | LOGICAL SHIFT |
| $S_{22}$ | $S_{23}$ | | |
| 1 | 0 | | UNSIGNED AND SIGNED MULTIPLY |
| $S_{24}$ | | | |
| 1 | | | ENABLE CRC (SPECIFIES UNSIGNED MULTIPLY WHEN $S_{22}, S_{23} = 1,0$) |

Figure 11:
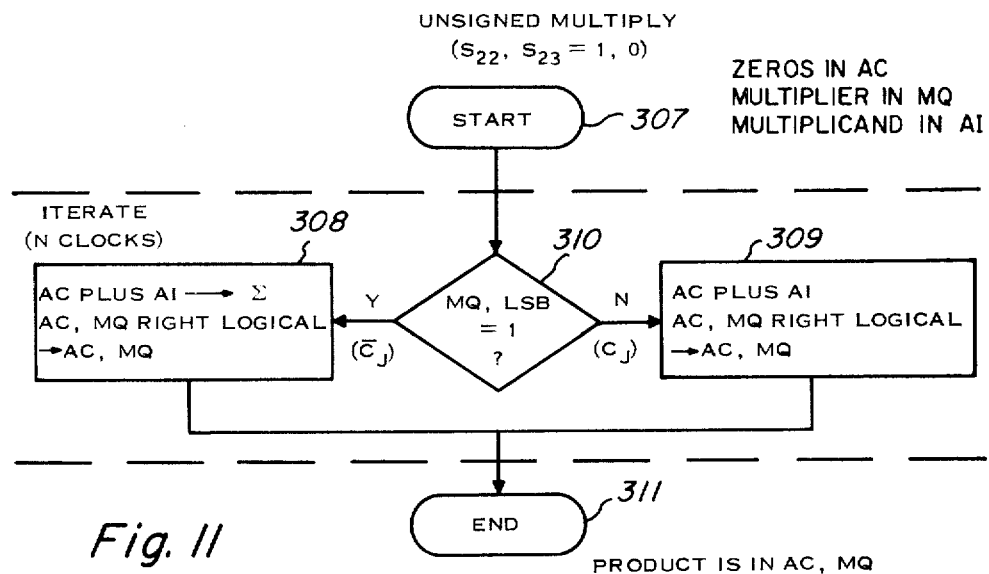
FIG. 11 is a flowchart illustrating the unsigned multiply algorithm
Figure 12A:
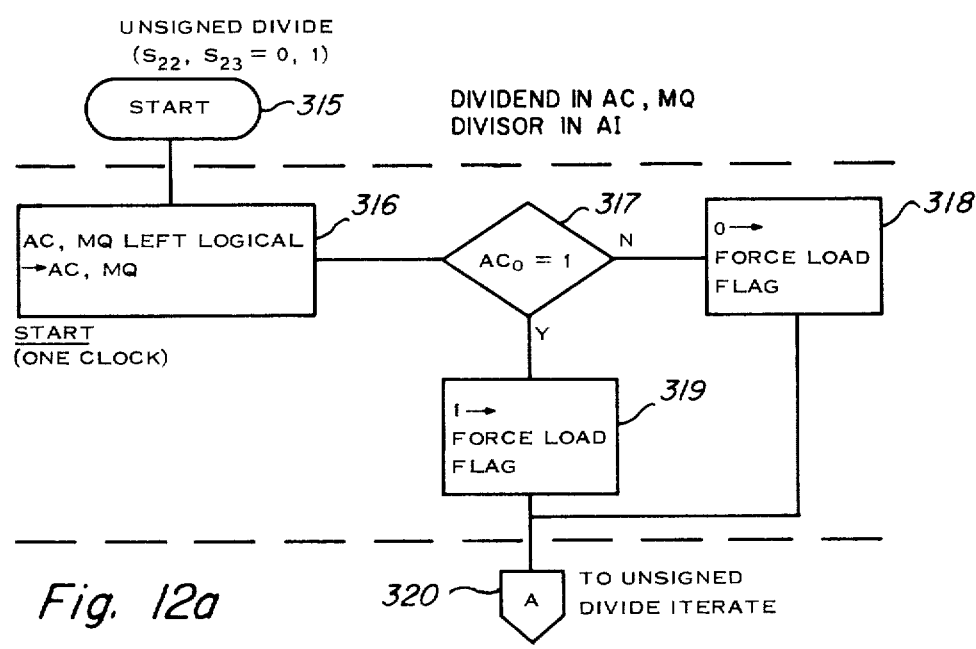
FIG. 12a–12b is a flowchart representing the unsigned divide algorithm.
Figure 12B:
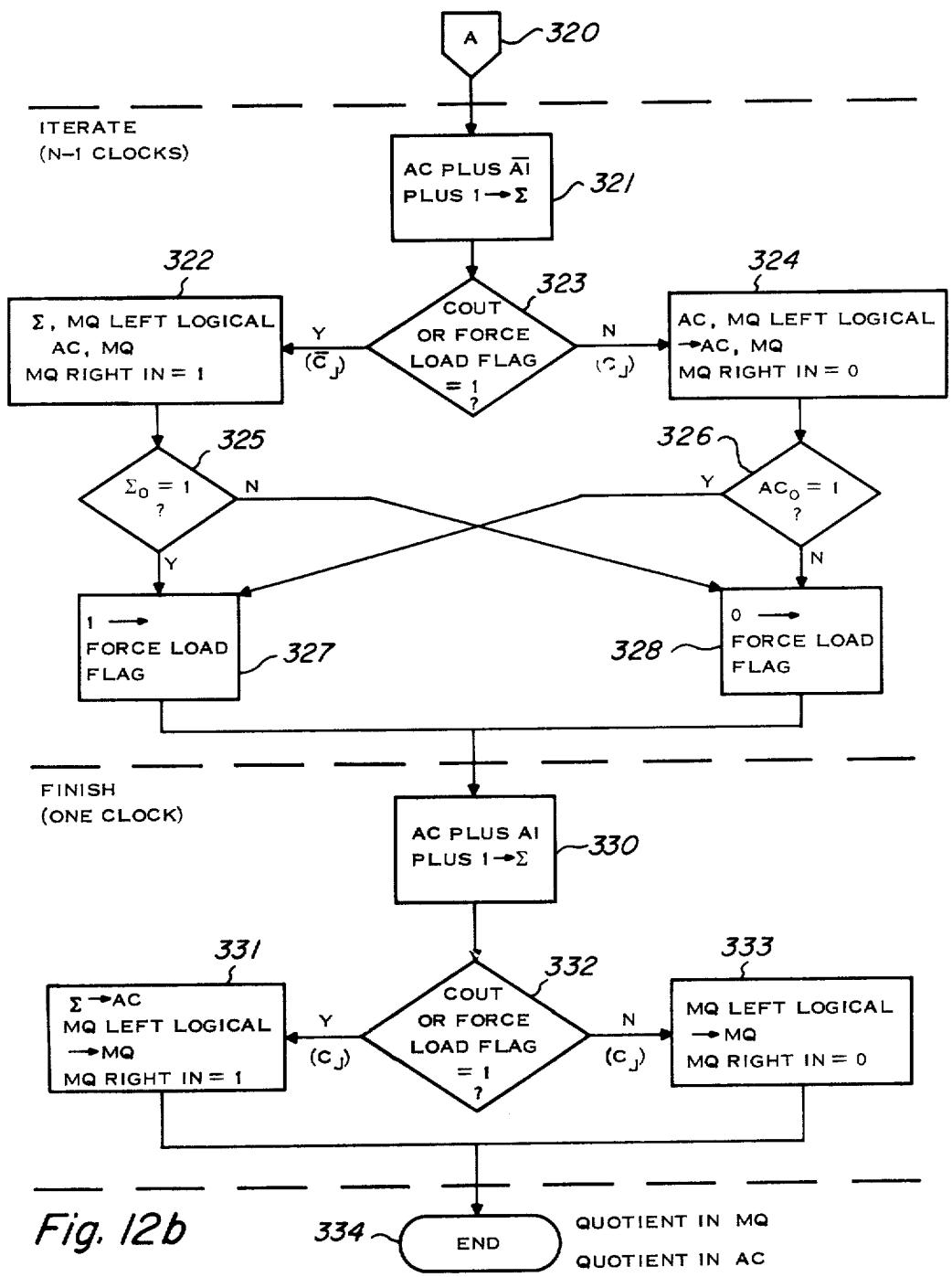

Referring now to FIG. 11, the unsigned multiply is started with the requirement that the accumulator be loaded with zeros; the multiplier is in the multiplier/-quotient register; the multiplicand is in the AI input. Starting at block 307, the unsigned multiply algorithm is initiated. At block 310 it is shown that a determination is made as to whether the least significant bit of the MQ register = 1. For an understanding of how this determination is made, refer to FIGS. 5b and 6b. As indicated above, the shift to be made in this unsigned multiply algorithm is a double-length, right logical shift. In essence, a double length register is formed with the AC register being the upper half and the MQ register being the lower half. $S_{12}$ and $S_{19} = 1$, as shown above, for this shift. These control signals appropriately gate the multiplexers 301-308 to provide the required interconnection. ACR is always connected to ACL and MQR is always connected to MQL. For this particular shift, the multiplexer 307 down to line MQR which is connected to line MQL which is itself disabled for this particular shift. The least significant bit of the AC register 20 is shown having an output $AC_3$ in FIG. 5a which is passed by multiplexer 303 onto line ACR which is connected to line ACL in FIG. 5b. Line ACL, as indicated above is passed by multiplexer 306. Multiplexer 302 passes the input signal "0" as input signal ACL' to multiplexer 25 shown in FIG. 5a.

Now, referring to FIG. 7, it can be seen that one input to exclusive OR circuit 137 is "MQL". The other input from flip flop 136 is forced to a "0" in this particular algorithm. The input MQL carries the least significant bit value $MQ_3$ as described above. When combined in the exclusive OR circuit 137 with the "0" input from flip flop 136, the result is simply the value of the least significant bit being impressed on open collector NAND circuit 138. If the least significant bit = 0, $C_J$ remains a "1". If the least significant bit = 1, then $C_J = 0$.

Referring back to FIG. 11, if the least significant bit of MQ does not equal 1, then the operations listed in block 309 take place. That is, the addition of AI + AC is made in AU 200 and the result goes into the sum bus 41. However, the result is not used in this case and the combination of the AC and MQ total double length register is right logical shifted one bit. These operations are dictated by the control bits set out above.

Now assume that the next least significant bit in MQ = 1. Then $C_J = 0$ and the operations in block 308 take place. When $C_J = 0$, the output control signals are changed. That is, specifically, $S_{11}$ goes from 0 to 1 and $S_{14}$ goes from 1 to 0. When $S_{11}$ and $S_{12}$ are both 1's, the resultant function is:

ΣRIGHT, XFER TO Σ', AND SHIFT RIGHT

When $S_{13} = 1$ and $S_{14} = 0$, the function is:

Σ' XFER TO AC

The contents of the accumulator 20 are added to the AI input in AU 200, with the sum going into sum bus 41. Keeping in mind that the sum bus 41 and the accumulator 20 have their input leads connected together the combination of the sum bus-MQ register is shifted one bit to the right, logical. In this manner, the shifted sum is entered into the AC register 20 and the shifted MQ 30 is entered into itself. This operation continues for the number of bits in the particular word. An example of this operation, with an 8-bit word, follows. The multiplicand in AI = 52 (decimal) and the multiplier in MQ-212 (decimal). The following chart illustrates the changes in the accumulator 20 and the MQ register 30 as the multiplication process takes place:

MULTIPLY EXAMPLE

Figure 6A:
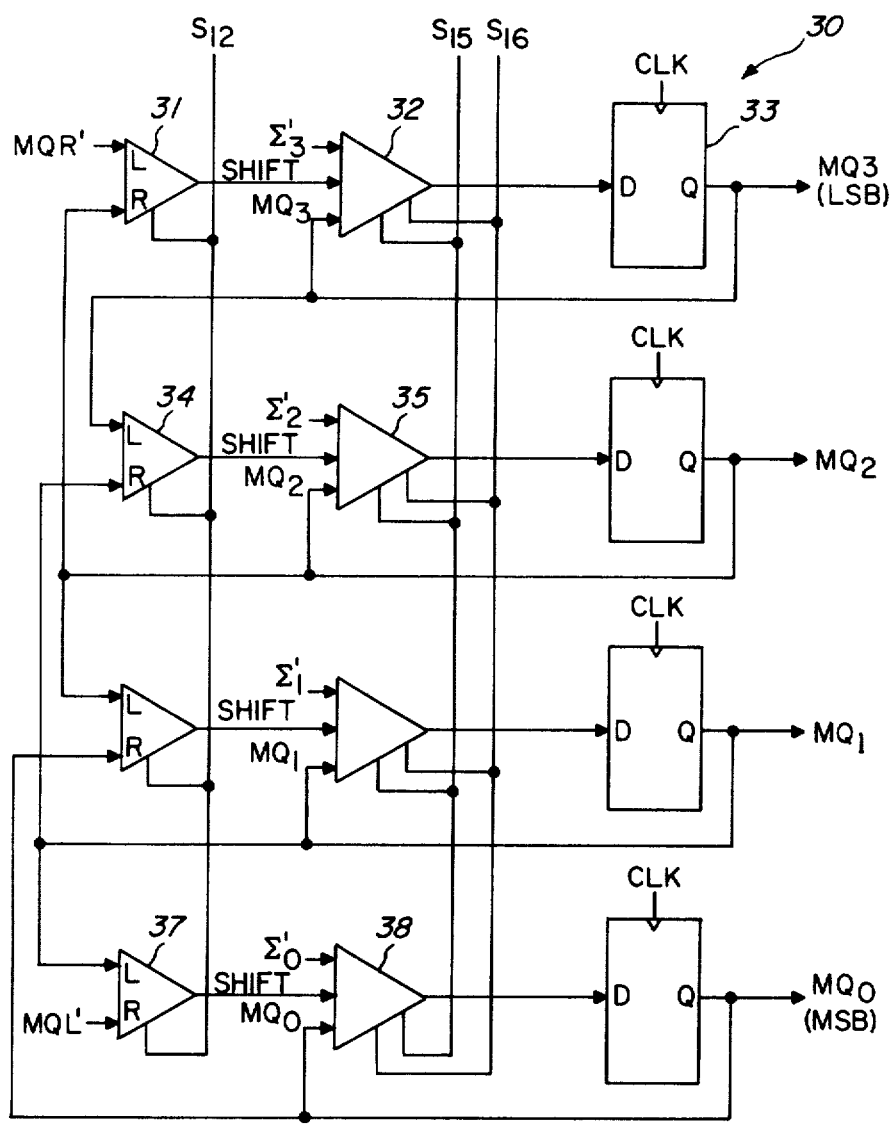
FIG. 6a is a schematic diagram of the MQ Register of FIG. 1.
Figure 6B:
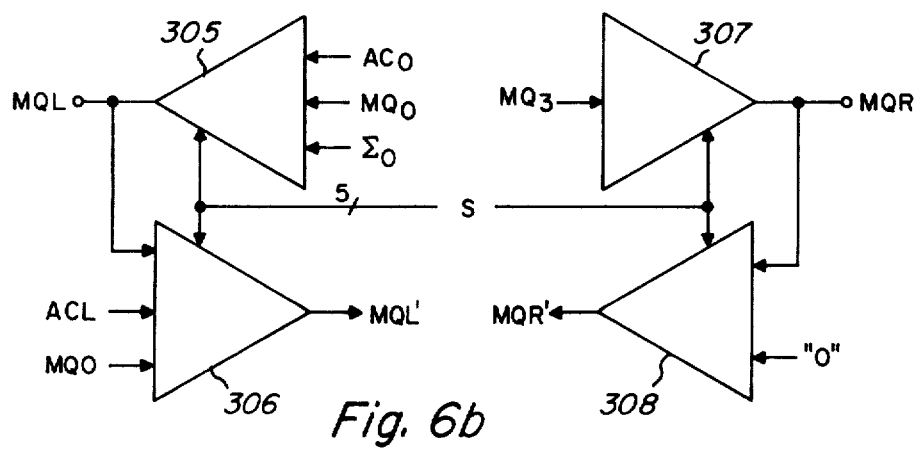
FIG. 6b is a schematic diagram of the shift logic of the MQ Register.

| AC | | | | | | | | MQ | | | | | | | | |
|---|---|---|---|---|---|---|---|---|---|---|---|---|---|---|---|---|
| 0 | 0 | 0 | 0 | 0 | 0 | 0 | 0 | 1 | 1 | 0 | 1 | 0 | 1 | 0 | 0 | 0 Setup |
| 0 | 0 | 0 | 0 | 0 | 0 | 0 | 0 | 0 | 1 | 1 | 0 | 1 | 0 | 1 | 0 | 1 Shift |
| 0 | 0 | 0 | 0 | 0 | 0 | 0 | 0 | 0 | 0 | 1 | 1 | 0 | 1 | 0 | 1 | 2 Shift |
| 0 | 0 | 0 | 1 | 1 | 0 | 1 | 0 | 0 | 0 | 0 | 1 | 1 | 0 | 1 | 0 | 3 Add,Load |
| 0 | 0 | 0 | 0 | 1 | 1 | 0 | 1 | 0 | 0 | 0 | 1 | 1 | 0 | 1 | 4 Shift |
| 0 | 0 | 1 | 0 | 0 | 0 | 0 | 1 | 0 | 0 | 0 | 1 | 1 | 0 | 5 Add,Load |
| 0 | 0 | 0 | 1 | 0 | 0 | 0 | 0 | 1 | 0 | 0 | 0 | 1 | 1 | 6 Shift |
| 0 | 0 | 1 | 0 | 0 | 0 | 1 | 0 | 0 | 0 | 1 | 0 | 0 | 0 | 1 | 7 Add,Load |
| 0 | 0 | 1 | 0 | 1 | 0 | 1 | 1 | 0 | 0 | 0 | 1 | 0 | 0 | 0 | 0 | 8 Add,Load | control signals provide a hookup of line ACL into multiplexer 306 producing the output signal MQL' which is then available as an input to the multiplier 37 of FIG. 6a. At the least significant end of the MQ register 30, output signal $MQ_3$ is available and is passed through The resultant binary number in register AC-MQ = 25,420 (octal) or 11,024 (decimal).

For the above two examples, it can be seen that the user need place only one set of command input bits into the arithmetic logic unit to achieve the generation of a cyclical redundancy character, or to multiply two numbers without regard to the signs of the numbers. In this particular embodiment, the remaining algorithms are the signed multiply, the unsigned divide and the signed divide.

the operational blocks shown in FIG. 1, the algorithm can be understood in detail in the same fashion as illustrated above.

An example of an eight bit signed multiply, with 52 (decimal) in AI as multiplicand, and −44 (decimal) in the MQ register as multiplier, follows:

| AC | | | | | | | | MQ | | | | | | | | |
|---|---|---|---|---|---|---|---|---|---|---|---|---|---|---|---|---|
| 0 | 0 | 0 | 0 | 0 | 0 | 0 | 0 | 1 | 1 | 0 | 1 | 0 | 1 | 0 | 0 | 0 Setup |
| 0 | 0 | 0 | 0 | 0 | 0 | 0 | 0 | 0 | 1 | 1 | 0 | 1 | 0 | 1 | 0 | 1 Shift AC,MQ |
| 0 | 0 | 0 | 0 | 0 | 0 | 0 | 0 | 0 | 0 | 1 | 1 | 0 | 1 | 0 | 1 | 2 Shift AC,MQ |
| 1 | 1 | 1 | 0 | 0 | 1 | 1 | 0 | 0 | 0 | 0 | 1 | 1 | 0 | 1 | 0 | 3 Sub,Load AC |
| 1 | 1 | 0 | 1 | 1 | 0 | 0 | 1 | 0 | 0 | 0 | 0 | 1 | 1 | 0 | 1 | 4 Sub,Load AC |
| 1 | 1 | 1 | 0 | 1 | 1 | 0 | 0 | 1 | 0 | 0 | 0 | 0 | 1 | 1 | 0 | 5 Shift AC,MQ |
| 1 | 1 | 0 | 1 | 1 | 1 | 0 | 0 | 0 | 1 | 0 | 0 | 0 | 0 | 1 | 1 | 6 Sub,Load AC |
| 1 | 1 | 1 | 0 | 1 | 1 | 1 | 0 | 0 | 0 | 1 | 0 | 0 | 0 | 0 | 1 | 7 Shift AC,MQ |
| 1 | 1 | 1 | 1 | 0 | 1 | 1 | 1 | 0 | 0 | 0 | 1 | 0 | 0 | 0 | 0 | 8 Shift AC,MQ |

In the case of the signed multiply, the following command input is given:

$$C_A\ C_B\ C_C\ C_D\ C_E\ C_F\ C_G\ C_H\ C_I\ C_J\ \overline{CIN}$$

| 1 | 1 | 1 | 1 | 0 | 1 | 1 | 1 | 1 | 1 |

Figure 13:
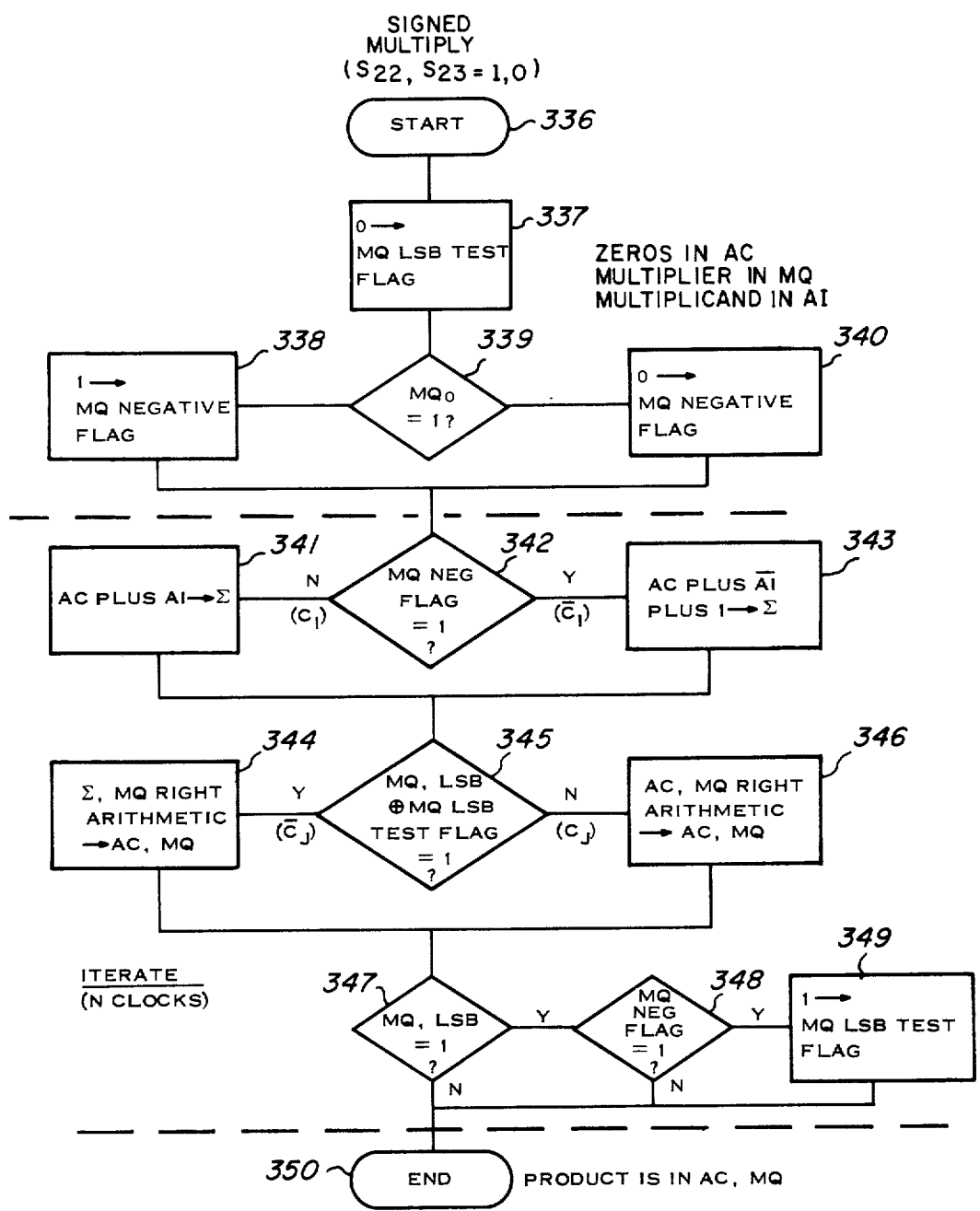
FIG. 13 is a flowchart representing the signed multiply algorithm.

That is the only input with which the user need concern himself. With that particular configuration of command input signals, the control signals as shown at line 7 of FIG. 8 are generated. Please note that in this algorithm, not only does $C_J$ change, but also $\overline{C\ IN}$ and $C_I$. The flowchart of FIG. 13 illustrates the operation of this algorithm. By referring to the logic of FIG. 8 for those items shown in the diamond-shaped blocks 339, 342, 345, 347 and 348, and to the functions dictated by the control signals shown in FIG. 8 in conjunction with The binary result (two's complement) = −2288 (decimal)

In the case of unsigned divide, the user must sequentially apply three input commands as shown:

| Command Input | | | | | | | | | | | |
|---|---|---|---|---|---|---|---|---|---|---|---|
| $C_A$ | $C_B$ | $C_C$ | $C_D$ | $C_E$ | $C_F$ | $C_G$ | $C_H$ | $C_I$ | $C_J$ | $\overline{CIN}$ | |
| 1 | 1 | 1 | 1 | 0 | 0 | 0 | 0 | 1 | 1 | 0 | -Unsigned Divide Start (1 clock) |
| 1 | 1 | 1 | 1 | 0 | 0 | 0 | 1 | 1 | 1 | 0 | -Unsigned Divide Iterate (n-1 clocks)* |
| 1 | 1 | 1 | 1 | 0 | 0 | 0 | 1 | 0 | 1 | 0 | -Unsigned Divide Finish (1 clock) |

*n = word length in bits

With reference to FIG. 8, the unsigned divide start is shown at line 11, unsigned divide iterate is shown at lines 14 and 13, and the unsigned divide finish, depending upon the results of the unsigned divide iterate, is at lines 16 or 17. An example of unsigned divide, with a divisor of 55 (decimal) in the AI input and a dividend of 1449 (decimal) in AC-MQ, follows:

| AC | | | | | | | | MQ | | | | | | | | |
|---|---|---|---|---|---|---|---|---|---|---|---|---|---|---|---|---|
| 0 | 0 | 0 | 0 | 1 | 0 | 1 | 1 | 0 | 1 | 0 | 1 | 0 | 0 | 1 | | 0 Unsigned Div. Start |
| 0 | 0 | 0 | 0 | 1 | 0 | 1 | 1 | 0 | 1 | 0 | 1 | 0 | 0 | 1 | X | 1 Unsigned Div. Operate |
| 0 | 0 | 0 | 1 | 0 | 1 | 1 | 0 | 1 | 0 | 1 | 0 | 0 | 1 | X | 0 | 2 Unsigned Div. Operate |
| 0 | 0 | 1 | 0 | 1 | 1 | 0 | 1 | 0 | 1 | 0 | 0 | 1 | X | 0 | 0 | 3 Unsigned Div. Operate |
| 0 | 1 | 0 | 1 | 1 | 0 | 1 | 0 | 1 | 0 | 0 | 1 | X | 0 | 0 | 0 | 4 Unsigned Div. Operate |
| 0 | 1 | 0 | 0 | 1 | 1 | 1 | 0 | 0 | 1 | X | 0 | 0 | 0 | 1 | | 5 Unsigned Div. Operate |
| 0 | 0 | 1 | 0 | 0 | 0 | 0 | 0 | 1 | X | 0 | 0 | 0 | 1 | 1 | | 6 Unsigned Div. Operate |
| 0 | 1 | 0 | 0 | 0 | 0 | 0 | 1 | X | 0 | 0 | 0 | 1 | 1 | 0 | | 7 Unsigned Div. Operate |
| 0 | 0 | 0 | 1 | 0 | 0 | 1 | 1 | X | 0 | 0 | 0 | 1 | 1 | 0 | 1 | 8 Unsigned Div. Finish |
| 0 | 0 | 0 | 1 | 0 | 0 | 1 | 1 | 0 | 0 | 0 | 1 | 1 | 0 | 1 | 0 | 9 Result |

X = Don't Care

The quotient of 26 (decimal) is in the MQ register and the remainder 19 is in the AC register.

The signed divide algorithm is quite complex and as a result requires the user to sequentially impress five command inputs to the arithmetic logic unit as shown below:

| Command Input | | | | | | | | | | | |
|---|---|---|---|---|---|---|---|---|---|---|---|
| $C_A$ | $C_B$ | $C_C$ | $C_D$ | $C_E$ | $C_F$ | $C_G$ | $C_H$ | $C_I$ | $C_J$ | $\overline{CIN}$ | |
| 1 | 1 | 1 | 1 | 0 | 0 | 1 | 0 | 1 | 1 | 1 | - Signed Divide Start (1 Clock) |
| 1 | 1 | 1 | 1 | 0 | 1 | 0 | 1 | 1 | 1 | 1 | - Signed Divide Iterate (n-1 clocks)* |
| 1 | 1 | 1 | 1 | 0 | 1 | 1 | 0 | 1 | 1 | 1 | - Signed Divide Finish (1 clock) |
| 1 | 1 | 1 | 1 | 0 | 1 | 0 | 0 | 1 | 1 | 1 | - Signed Divide Fix Remainder (1 clock) |

-continued

| Command Input | | | | | | | | | | | |
|---|---|---|---|---|---|---|---|---|---|---|---|
| $C_A$ | $C_B$ | $C_C$ | $C_D$ | $C_E$ | $C_F$ | $C_G$ | $C_H$ | $C_I$ | $C_J$ | $\overline{C_{IN}}$ | |
| 1 | 1 | 1 | 1 | 0 | 0 | 1 | 1 | 1 | 1 | 1 | - Signed Divide Adjust Quotient (1 clock) |

*n = word length in bits

FIG. 9 illustrates the various control bits activated by the signed divide algorithm. At line 1, the control signals for "Signed Divide Start" are shown. At line 6, the control signals for "Signed Divide Iterate" are shown with changed control signals resulting from changes in state of signals $C_J$ and $\overline{C_{IN}}$. The control signals for "Signed Divide Finish" are shown in lines 7-10, depending upon the results of the "Signed Divide Iterate". Control signals for "Signed Divide Fix Remainder" are shown in lines 11-14, depending upon the previous results. The control signals for "Signed Divide Adjust Quotient" are shown in lines 15-18, again dependent upon the previous results.

Figure 14A:
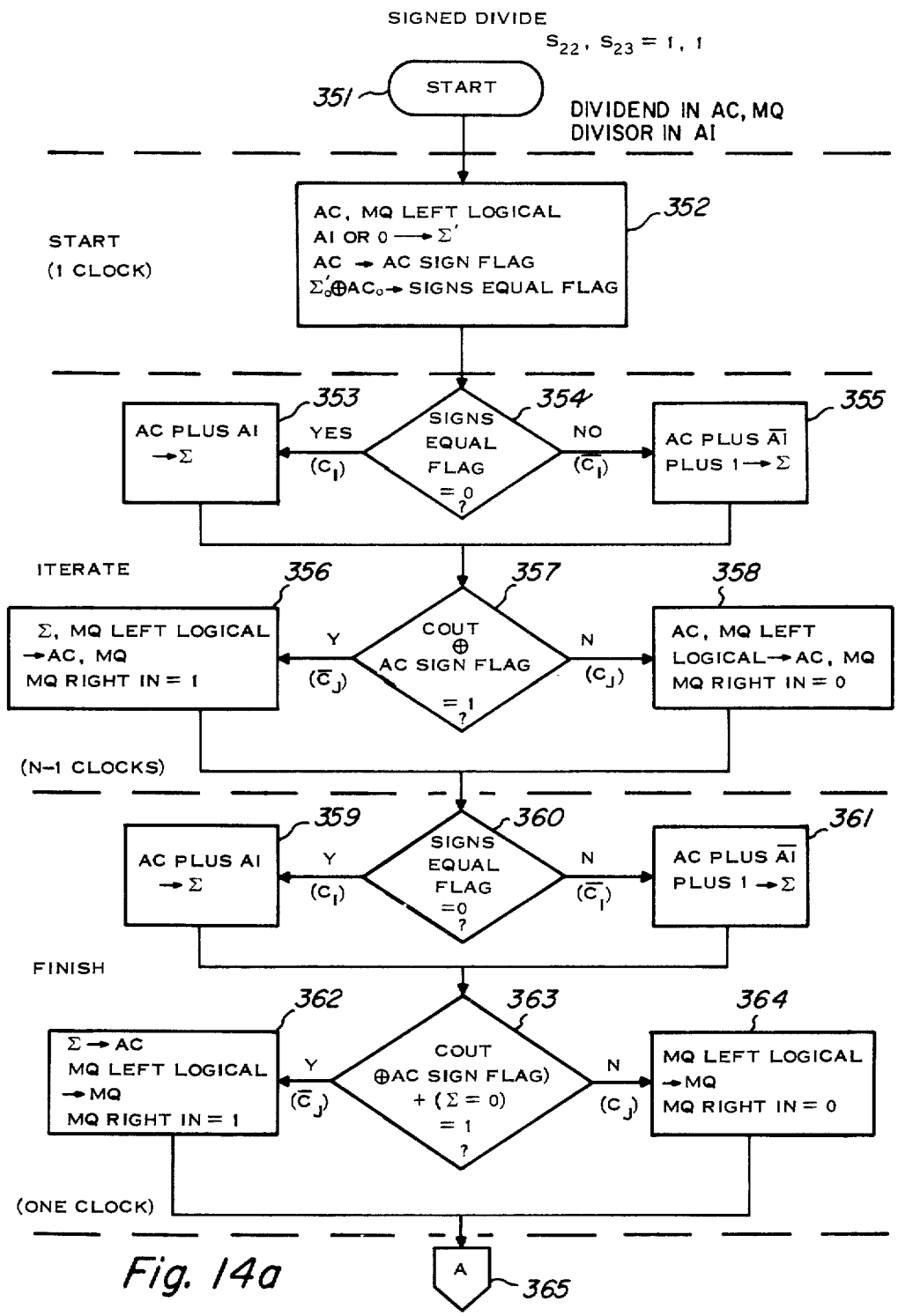
FIG. 14a–14b is a flowchart illustrating the signed divide algorithm.
Figure 14B:
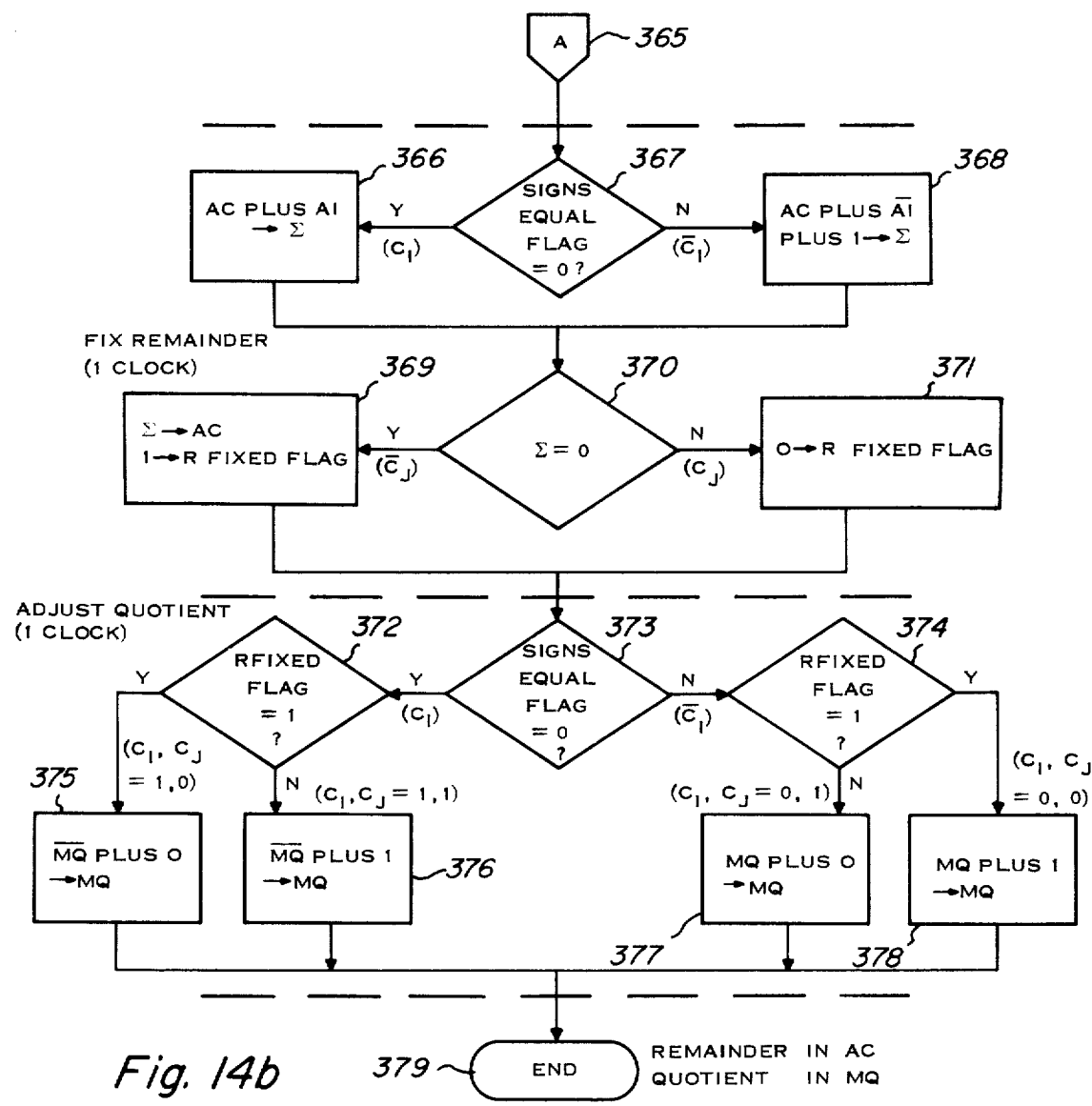

Reference to FIG. 9 and to FIGS. 14a and 14b teaches the actual operation of this algorithm in detail as has been described for the CRC generation and unsigned multiply above.

An example of a signed divide, with a divisor of −121 (decimal) in the AI input and a dividend of 3855 (decimal) in the AC-MQ register follows:

| AC | | | | | | | | MQ | | | | | | | |
|---|---|---|---|---|---|---|---|---|---|---|---|---|---|---|---|
| 0 | 0 | 0 | 0 | 1 | 1 | 1 | 1 | 0 | 0 | 0 | 0 | 1 | 1 | 1 | 1 S |
| 0 | 0 | 0 | 1 | 1 | 1 | 1 | 0 | 0 | 0 | 0 | 1 | 1 | 1 | 1 | X 1 |
| 0 | 0 | 1 | 1 | 1 | 1 | 0 | 0 | 0 | 0 | 1 | 1 | 1 | 1 | X | 0 1 |
| 0 | 1 | 1 | 1 | 1 | 0 | 0 | 0 | 0 | 1 | 1 | 1 | 1 | X | 0 | 0 1 |
| 1 | 1 | 1 | 1 | 0 | 0 | 0 | 0 | 1 | 1 | 1 | 1 | X | 0 | 0 | 0 1 |
| 1 | 1 | 1 | 0 | 1 | 1 | 1 | 1 | 1 | 1 | X | 0 | 0 | 0 | 0 | 1 I |
| 1 | 1 | 1 | 0 | 1 | 1 | 0 | 1 | 1 | 1 | X | 0 | 0 | 0 | 1 | 1 I |
| 1 | 1 | 1 | 0 | 1 | 0 | 0 | 1 | 1 | X | 0 | 0 | 0 | 1 | 1 | 1 I |
| 1 | 1 | 1 | 0 | 0 | 0 | 0 | 1 | X | 0 | 0 | 0 | 1 | 1 | 1 | 1 F |
| 0 | 1 | 1 | 0 | 1 | 0 | 0 | 0 | 0 | 0 | 0 | 1 | 1 | 1 | 1 | 1 FR |
| 0 | 1 | 1 | 0 | 1 | 0 | 0 | 0 | 0 | 0 | 1 | 1 | 1 | 1 | 1 | 1 AQ |
| 0 | 1 | 1 | 0 | 1 | 0 | 0 | 0 | 1 | 1 | 1 | 0 | 0 | 0 | 0 | 1 Result |

The quotient of −31 (decimal) is found in register MQ and the remainder of 104 is found in register AC.

As stated earlier, FIGS. 8 and 9 are graphic representations of the contents of the PLA of FIG. 1. The illustrations are in expanded form for clarity. The actual map of FIGS. 8 and 9, by way of a minterm process is shown in FIG. 15.

Figure 16A:
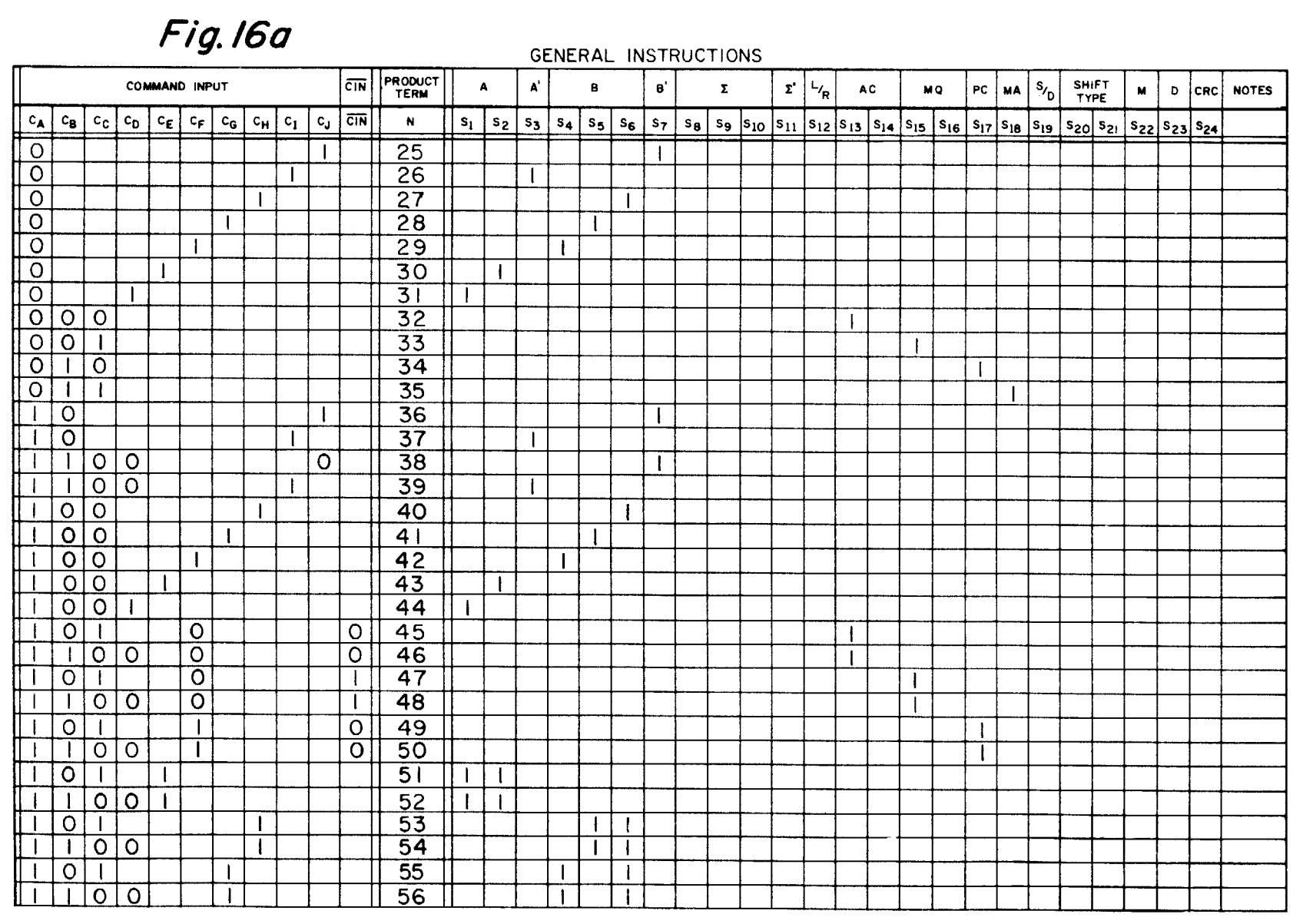
Figure 16B:
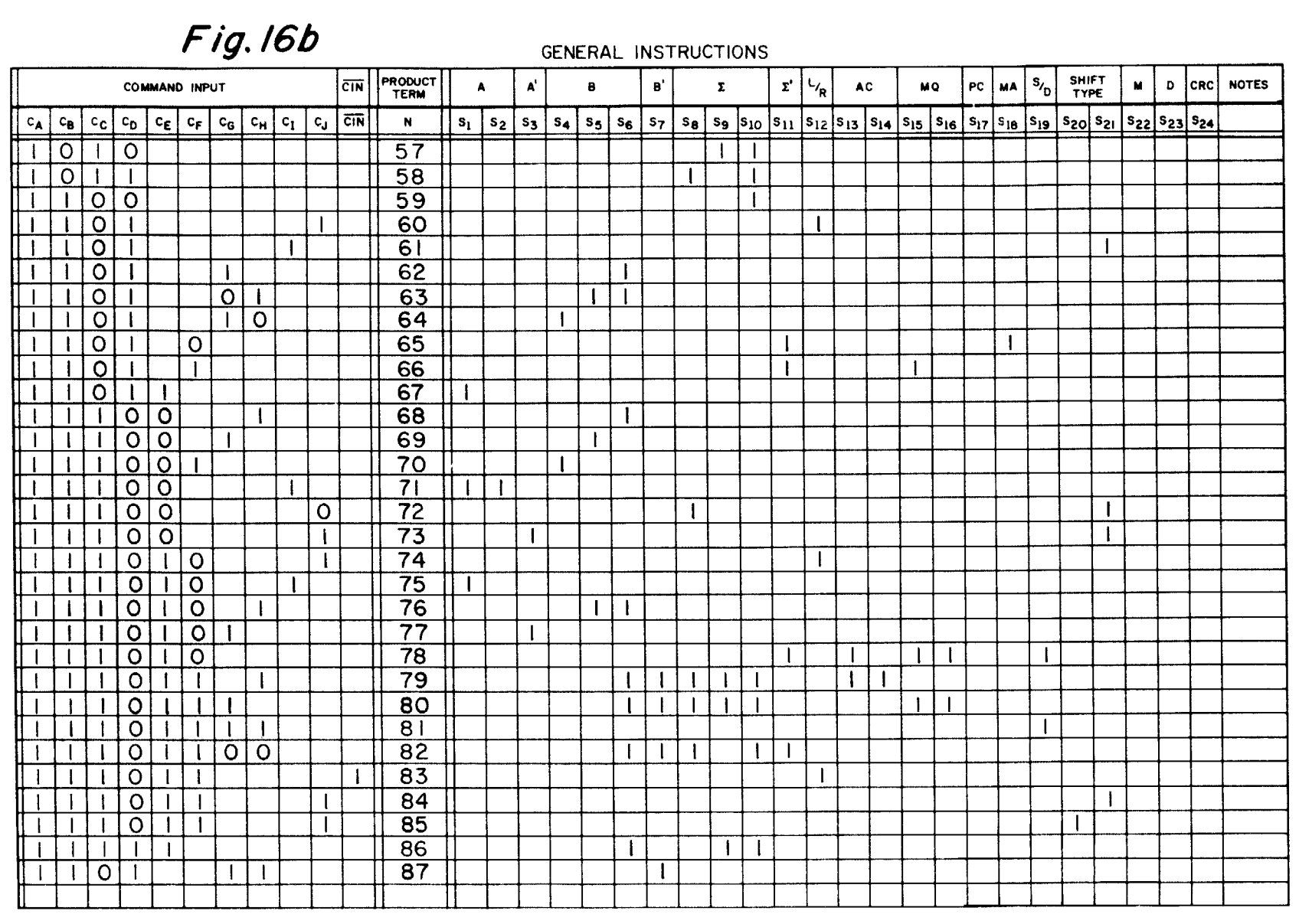

The general instructions of the arithmetic logic unit of this invention are mapped in the decode PLA as shown in FIGS. 16a and 16b.

Those skilled in the art are aware that the details of this invention are flexible, that various types of logic may be employed, various types of PLA's and certainly various types of algorithms may be used without departing from the scope of this invention.

I claim:

1. An arithmetic logic unit bit-slice implemented in a semiconductor substrate and adapted to be concatenated with one or more identical bit-slices to form an arithmetic logic unit of any desired length, comprising:
    (a) an arithmetic unit having an input and an output;
    (b) operand input means for receiving at least two operands, connected to the arithmetic unit input;
    (c) accumulator means having input means connected to the output of the arithmetic unit; and
    (d) control means having input means for receiving external functions including a clock and command inputs, and having output means connected to the arithmetic unit, to the operand input means and to the accumulator means for controlling the operation of the bit-slice to cause iterative algorithms to be performed in response to the external functions applied to the input means.

2. The apparatus of claim 1 wherein the control means further comprises:
    (d) (i) logic array means connected to the control means input means for receiving the command inputs and for providing control signal outputs dictated by the command inputs; and
    (ii) logic control means connected to the control means input means and to the logic array means for receiving the external functions excluding the command inputs, and the control signal outputs for performing iterative algorithms in conformance with the external functions excluding the command inputs, and with the control signal outputs.

3. The apparatus of claim 2 wherein the logic array means is a programmable logic array.

4. The apparatus of claim 2 wherein the logic array means is a read-only memory.

5. An arithmetic logic unit comprised of a plurality of concatenated arithmetic logic unit bit-slices, each bit-slice implemented in a semiconductor substrate and each bit-slice comprising:
    (a) an arithmetic unit having an input and an output;
    (b) operand input means for receiving at least two operands, connected to the arithmetic unit input;
    (c) accumulator means having input means connected to the output of the arithmetic unit;
    (d) voltage input means for receiving three input voltages;
    (e) means for providing a plurality of standard voltages;
    (f) comparison means, for comparing one of the three input voltages with the plurality of standard voltages to provide a digital output signal when a predetermined difference in voltages exists, the digital outpt signal corresponding to the voltage input and representative of the least significant digit, the most significant digit or the middle digit relative to the other bit-slices; and
    (g) control means having input means for receiving external functions including a clock and command inputs and for receiving the output of the comparison means, and having output means connected to the arithmetic unit, to the operand input means and to the accumulator means for controlling the operation of the bit-slice to cause iterative algorithms to be performed in response to the external functions applied to the input means.

6. The apparatus of claim 5 wherein the control means further comprises:
   (f) (i) logic array means connected to the control means input means for receiving the command inputs and for providing control signal outputs dictated by the command inputs; and
   (ii) logic control means connected to the control means input means, to the logic array means and to the comparison means for receiving the external functions excluding the command inputs, and the digital output signal for performing logic operations in conformance with the external functions excluding the command inputs, with the digital output signal and with the control signal outputs.

7. The apparatus of claim 6 wherein the logic array means is a programmable logic array.

8. The apparatus of claim 6 wherein the logic array means is a read-only memory.

9. Position identification means in a bit-slice, implemented in a semiconductor substrate and concatenated with at least two other bit slices, comprising:
   (a) voltage input means for receiving a plurality of input voltages;
   (b) means for providing a plurality of standard voltages; and
   (c) comparison means for comparing one of the plurality of input voltages with the plurality of standard voltages to provide a digital output signal when a predetermined difference in voltage exists, the digital output signal corresponding to the input voltage and being representative of the identification of the bit-slice.

10. An arithmetic logic unit bit-slice implemented in a semiconductor substrate comprising:
   (a) an arithmetic unit having an input and an output;
   (b) operand input means for receiving at least two operands, connected to the arithmetic unit input;
   (c) accumulator means having input means connected to the output of the arithmetic unit;
   (d) voltage input means for receiving a plurality of input voltages;
   (e) means for providing a plurality of standard voltages;
   (f) comparison means for comparing one of the plurality of input voltages with the plurality of standard voltages to provide a digital output signal when a predetermined difference in voltages exists, the digital output signal corresponding to the input voltage and being representative of the identification of the bit-slice; and
   (g) control means having input means for receiving external functions including a clock and command inputs and for receiving the output from the comparison means, and having output means connected to the arithmetic unit, to the operand input means and to the accumulator means for controlling the operation of the bit-slice to cause iterative algorithms to be performed in response to the external functions applied to the input means.

* * * * *